United States Patent
Handley et al.

(10) Patent No.: US 7,859,549 B2
(45) Date of Patent: Dec. 28, 2010

(54) COMPARATIVE IMAGE REVIEW SYSTEM AND METHOD

(75) Inventors: Carrie Handley, Waterloo (CA); Edmund H. Scorah, Rockwood (CA); Steve Rankin, Waterloo (CA)

(73) Assignee: AGFA Inc., Toronto (CA)

( * ) Notice: Subject to any disclaimer, the term of this patent is extended or adjusted under 35 U.S.C. 154(b) by 1662 days.

(21) Appl. No.: 11/073,622

(22) Filed: Mar. 8, 2005

(65) Prior Publication Data

US 2006/0238546 A1 Oct. 26, 2006

(51) Int. Cl.
G09G 5/02 (2006.01)
(52) U.S. Cl. .................................................... 345/619
(58) Field of Classification Search ................... 345/619
See application file for complete search history.

(56) References Cited

U.S. PATENT DOCUMENTS

| | | | |
|---|---|---|---|
| 5,644,611 A * | 7/1997 | McShane et al. .............. 378/98 |
| 6,895,128 B2 | 5/2005 | Bohnenkamp |
| 2002/0193676 A1 | 12/2002 | Bodicker et al. |
| 2002/0194019 A1 | 12/2002 | Evertsz |
| 2003/0071829 A1 | 4/2003 | Bodicker et al. |
| 2003/0187689 A1 | 10/2003 | Barnes et al. |
| 2006/0146071 A1* | 7/2006 | Morita et al. ................ 345/619 |
| 2006/0242143 A1* | 10/2006 | Esham et al. ................... 707/6 |
| 2007/0063998 A1* | 3/2007 | Mahesh ....................... 345/419 |
| 2007/0197909 A1* | 8/2007 | Kariathungal et al. ........ 600/437 |
| 2008/0117230 A1* | 5/2008 | Wegenkittl et al. .......... 345/619 |
| 2008/0126982 A1* | 5/2008 | Sadikali et al. .............. 715/810 |

FOREIGN PATENT DOCUMENTS

| | | |
|---|---|---|
| DE | 101 25 504 A1 | 12/2002 |
| DE | 101 32 697 A1 | 12/2005 |

(Continued)

OTHER PUBLICATIONS

Srinka Ghosh, Katherine P. Andriole and David E. Avrin: "Viewport: An object-oriented Approach to Integrate Workstation Software for Tile and Stack Mode Display" Journal of Digital Imaging, vol. 10, No. 3, Suppl 1 Aug. 1997: pp. 177-179.

(Continued)

*Primary Examiner*—Javid A Amini
(74) *Attorney, Agent, or Firm*—Bereskin & Parr LLP; Isis E. Caulder

(57) ABSTRACT

A comparative review system for displaying views associated with studies on first and second display areas according to a screen layout, a study view mode, and a hanging protocol. The screen layout is used to determine the number of display slots to display in the first and second display areas. This determination along with the study view mode is then used to determine whether to display a study in corresponding display slots associated with the first and second display areas. The number of display slots displayed, whether studies are displayed in corresponding display slots across displays, and the hanging protocol are used to determine which views to display within display slots. Each screen layout, study view mode and hanging protocol is associated with a comparative review mode, which in turn are combined into a comparative review sequence. The comparative review sequence allows for display and navigation through the various modes.

14 Claims, 16 Drawing Sheets

FOREIGN PATENT DOCUMENTS

| EP | 1 229 459 A2 | 8/2002 |
|---|---|---|
| EP | 1424648 A2 | 2/2004 |

OTHER PUBLICATIONS

Adrian Moise: "Designing better user interfaces for radiology Interpretation PHD Thesis" Aug. 2003, Simon Fraser University, Burnaby, British Columbia, Canada.

Kim Y et al: "Requirements for PACS Workstations" Image Management and Communication (IMAC) in Patent Care: New Technologies for Better Patent Care, Apr. 10, 1991.

PCT International Search Report for PCT/EP20006/050611 dated Mar. 3, 2006.

Preim et al., Integration of Measurement Tools in Medical 3d Visualizations, MeVis—Center for Medical Diagnostic Systems and Visualization, IEEE Visualization, pp. 21 to 28, Boston, Massachusetts, Nov. 1, 2002.

Evertsz et al., Softcopy Reading in Screening Mammography: European Projects SCREEN and SCREEN-TRIAL, Electromedica 70, No. 2, pp. 157 to 164, 2002.

* cited by examiner

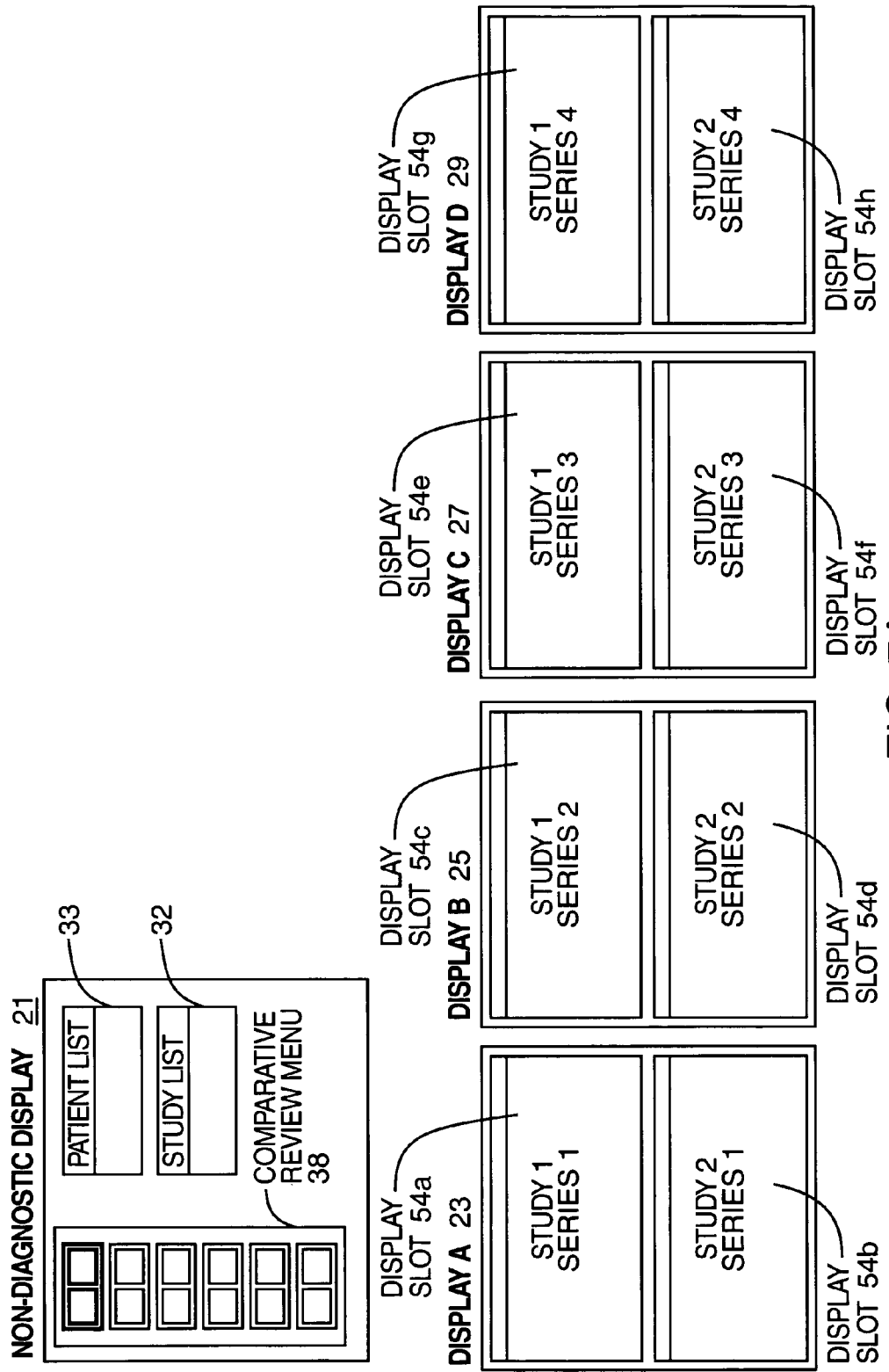

COMPARATIVE IMAGE REVIEW SYSTEM AND METHOD

FIELD OF THE INVENTION

This invention relates to an image display system and method and more particularly to a system and method for displaying different views for comparative review.

BACKGROUND OF THE INVENTION

Commercially available image display systems in the medical field utilize various techniques to present image views to a medical practitioner. Specifically, the image views produced within modalities such as Computed Radiograph (CR), Magnetic Resonance Imaging (MRI) and the like is displayed on a display terminal for review by a medical practitioner at a medical treatment site. These image views are used by the medical practitioner to determine the presence or absence of a disease, tissue damage etc. Many attempts to optimize the presentation of such image views to the medical practitioner in order to improve review quality and speed have been made.

Medical image views (i.e. views taken at different orientations within the patient) have been traditionally presented to a medical practitioner through the use of a hanging protocol. A hanging protocol is a display protocol that medical practitioners use to display different medical image views in a preferred sequence or order. Use of a hanging protocol allows the medical professional to review and study medical image views for a patient in a particular predictable sequence or order of interest. This allows the medical practitioner to more efficiently analyze medical image views for a large number of patients.

As shown in FIG. 1, in cases where physical films are still used, a technician clips such X-ray films 2 showing different image views for a patient onto a film alternator belt 3 according to a preferred viewing sequence or hanging protocol. The medical practitioner then has the technician run the film alternator belt 3 to display the various X-ray films 2 for a patient so that the views are displayed in a familiar sequence (i.e. according to a hanging protocol). The medical practitioner then reviews the various X-ray films 2 for the particular patient. In the example shown in FIG. 1, two studies are being compared view by view (i.e. the axial view of Current Study A is compared to the axial view of Prior Study B, etc.) for patient A. This particular arrangement allows the medical professional to compare and contrast the current views with prior views on a view-by-view basis. This process is repeated for each patient to be examined that day. It has been observed by medical practitioners that by regulating the order in which medical image views are presented for a particular diagnostic review, it is possible to obtain effective and efficient review.

Since the advent of digitized image views, medical image display systems have made attempts at incorporating the hanging protocol concept into medical image display systems. Today, computerized medical image review systems provide a medical practitioner with the ability to display a particular set of images in a particular sequence or order on a display screen and across multiple display screens.

However, such image display systems require the medical practitioner to manually select a number of display parameters before providing the desired comparative review image display. For example, the medical practitioner will typically need to first select a desired screen layout. A screen layout is a definition of how images of a patient are to be arranged and displayed on a display and includes the number of studies to display, the number of series to display and the number of images to display. Then the medical practitioner needs to select a study type (e.g. X-RAY, CT SCAN, etc.) and the status of study (e.g. new, prior, reported, etc.) all of which will affect certain display parameters within the system. Finally, the medical practitioner will then need to manually select an optimal study view mode, namely how the studies of a patient are to be arranged across multiple monitors for the screen layout previously selected.

That is, conventional image display systems require the medical practitioner to manually enter a substantial number of image characteristics and image viewing preferences in order to obtain a desired display of medical image views. The provision of such instructing commands can be inconvenient and time consuming. Also, these kinds of image display systems do not allow for automatic coupling of screen layouts with hanging protocols. In view of the fact that a medical practitioner typically reviews medical images associated with numerous patients on a daily basis (e.g. radiologists typically screen between 100 to 150 patients a day), such a cumbersome approach does not allow the medical practitioner to optimize the quality or speed of medical image review.

Some prior art systems provide automation of certain aspects of the image display process.

For example, U.S. Pat. No. 5,644,611 to McShane discloses an apparatus and method for maximizing the number of digital radiological images displayed on a display screen. Non-image portions of various medical image frames are reduced to maximize the number of images that can be presented on one image display screen. Also, the modified image frames are arranged on a display screen relative to one another in a plurality of rows and columns such that all image frames have the same widths and length.

Also, European Patent Application No. 1,229,459 to Shastri et al. discloses an image display method that provides a layout of image views based on a display protocol in which multiple display protocols are lined up in a predetermined order. The specific presentation protocols are stored in the memory of the displaying workstation such that a user can select a particular layout by specifying a particular display protocol sequence.

However, neither of these prior art systems provide an integrative approach to image display that reduces the amount of user input required for optimal display of medical image views according to a screen layout, a study view mode and hanging protocol.

SUMMARY OF THE INVENTION

The invention provides in one aspect, a comparative image review system for displaying a first series and a second series associated with a first study on first and second display areas according to a first comparative review mode having a first screen layout, a first study view mode, a first series view mode, and a first hanging protocol, said first screen layout containing at least one display slot, said system comprising:

(a) a memory for storing the first screen layout, the first study view mode, the first hanging protocol, and first and second series;

(b) a processor coupled to the memory for:
(I) using the first screen layout to determine the number of display slots to be associated with the first and second display areas, wherein the first study is displayed within at least one of the display slots;
(II) using the number of display slots determined in (I) and the first study view mode to determine whether to display the first study both within a display slot associated with the first display area and a corresponding display slot associated with the second display area;

(III) using the number of display slots determined in (I) and the first series view mode to determine whether to display the first series both within a display slot associated with the first display area and a corresponding display slot associated with the second display area; and (IV) using the number of display slots as determined in (I), the determinations in (II) and (III) and the first hanging protocol to determine which of, and the order in which, the first and second series of the first study are to be displayed within the display slots associated with the first and second display areas.

The invention provides in another aspect a method for displaying a first and a second series associated with a first study on first and second display areas according to a first comparative review mode having a first screen layout, a first study view mode, a first series view mode, and a first hanging protocol, said first screen layout containing at least one display slot, said method comprising:

(a) storing the screen layout, the study view mode, the hanging protocol, and the first and second series;

(b) using the first screen layout to determine the number of display slots to be associated with the first and second display areas, wherein the first study is displayed within at least one of the display slots;

(c) using the number of display slots as determined in (b) and the first study view mode to determine whether to display the first study both within a display slot associated with the first display area and a corresponding display slot associated with the second display area;

(d) using the number of display slots as determined in (b) and the first series view mode to determine whether to display the first series in both a display slot associated with the first display area and a corresponding display slot associated with the second display area; and (e) using the number of display slots as determined in (b), the determinations in (c) and (d) and the first hanging protocol to determine which of, and in the order in which, the first and second series of the first study are to be displayed within the display slots associated with the first and second display areas.

The invention provides in another aspect a comparative image review system for the display of a first series and a second series associated with a first study on first and second display areas according to a comparative review sequence, said system comprising:

(a) a memory for storing a plurality of comparative review modes, wherein each comparative review mode includes:

(I) a screen layout defining a number of display slots to be associated with the first and second display areas, wherein the first study is displayed within at least one of the display slots;

(II) a study view mode that can be used, along with the number of display slots as determined in (I), to determine whether to display the first study both within a display slot associated with the first display area and a corresponding display slot associated with the second display area;

(III) a series view mode that can be used, along with the number of display slots as determined in (I), to determine whether to display the first series both within a display slot associated with the first display area and a corresponding display slot associated with the second display area;

(IV) a hanging protocol that can be used, along with the number of display slots as determined in (I), the determinations in (II) and (III) to determine which of, and the order in which, the first and second series of the first study are to be displayed within the display slots associated with the first and second display areas.

(b) a processor coupled to the memory for:

(V) selecting at least two of the comparative review modes from the plurality of comparative review modes;

(VI) arranging the at least two comparative review modes in a particular order; and (VII) creating the comparative review sequence from the arrangement in (VI) for application to the first study.

The invention provides in another aspect a method for the display of a first series and a second series associated with a first study on first and second display areas according to a comparative review sequence, said method comprising:

(a) storing a first comparative review mode and a second comparative review mode, wherein each comparative review mode includes:

(I) a screen layout defining a number of display slots to be associated with the first and second display areas, wherein the first study is displayed within at least one of the display slots;

(II) a study view mode that can be used, along with the number of display slots as determined in (I), to determine whether to display the first study both within a display slot associated with the first display area and a corresponding display slot associated with the second display area;

(III) a series view mode that can be used, along with the number of display slots as determined in (I), to determine whether to display the first series both within a display slot associated with the first display area and a corresponding display slot associated with the second display area;

(IV) a hanging protocol that can be used, along with the number of display slots as determined in (I), the determinations in (II) and (III) to determine which of, and the order in which, the first and second series of the first study are to be displayed within the display slots associated with the first and second display areas;

(b) selecting at least two of the comparative review modes from the plurality of comparative review modes;

(c) arranging the at least two comparative review modes in a particular order; and (d) creating the comparative review sequence from the arrangement in (VI) for application to the first study.

Further aspects and advantages of the invention will appear from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show some examples of the present invention, and in which:

FIGS. 7A to 7D are schematic diagrams illustrating the result of the application of various study and series layouts when used in combination with the SPAN ALL SCREENS study view mode of the comparative image review system of FIG. 2.

Figure 1:
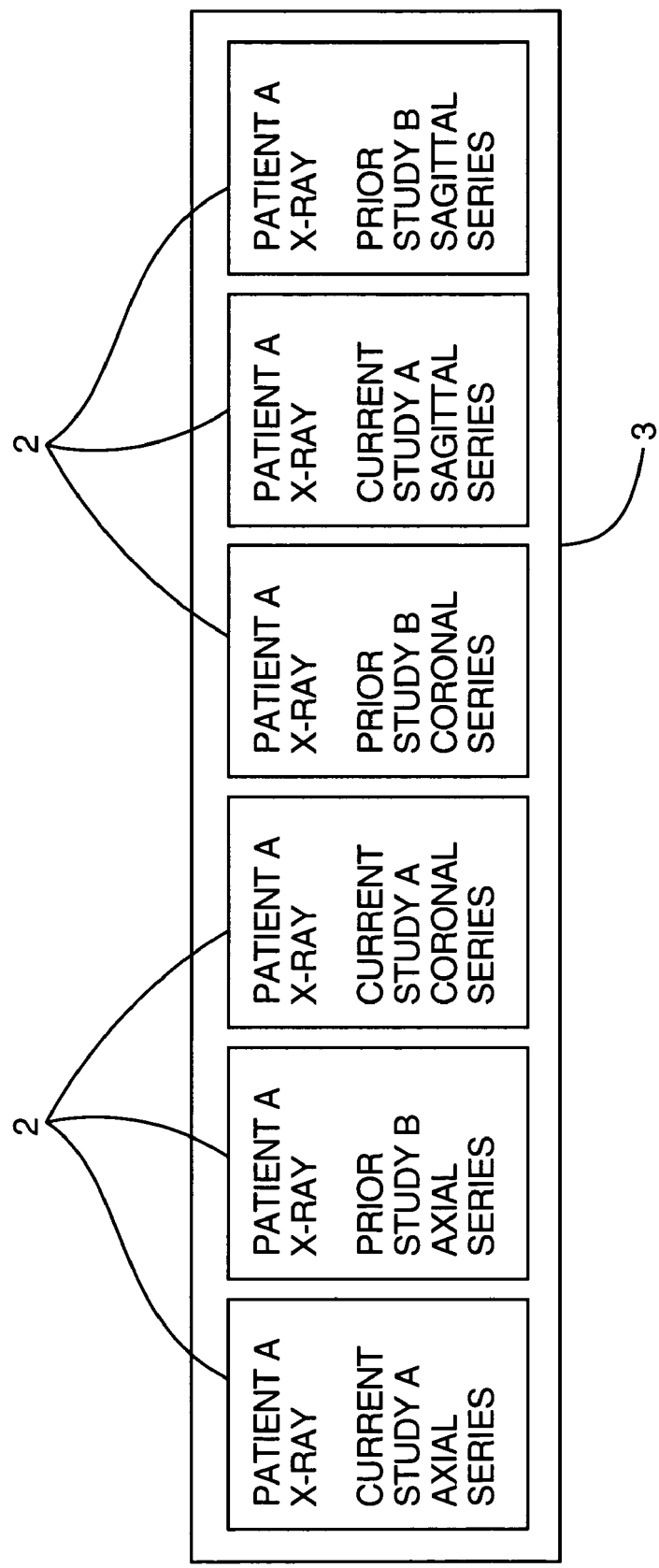
FIG. 1 is a diagram illustrating a traditional method for displaying medical images to a medical practitioner according to a hanging protocol.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Figure 2:
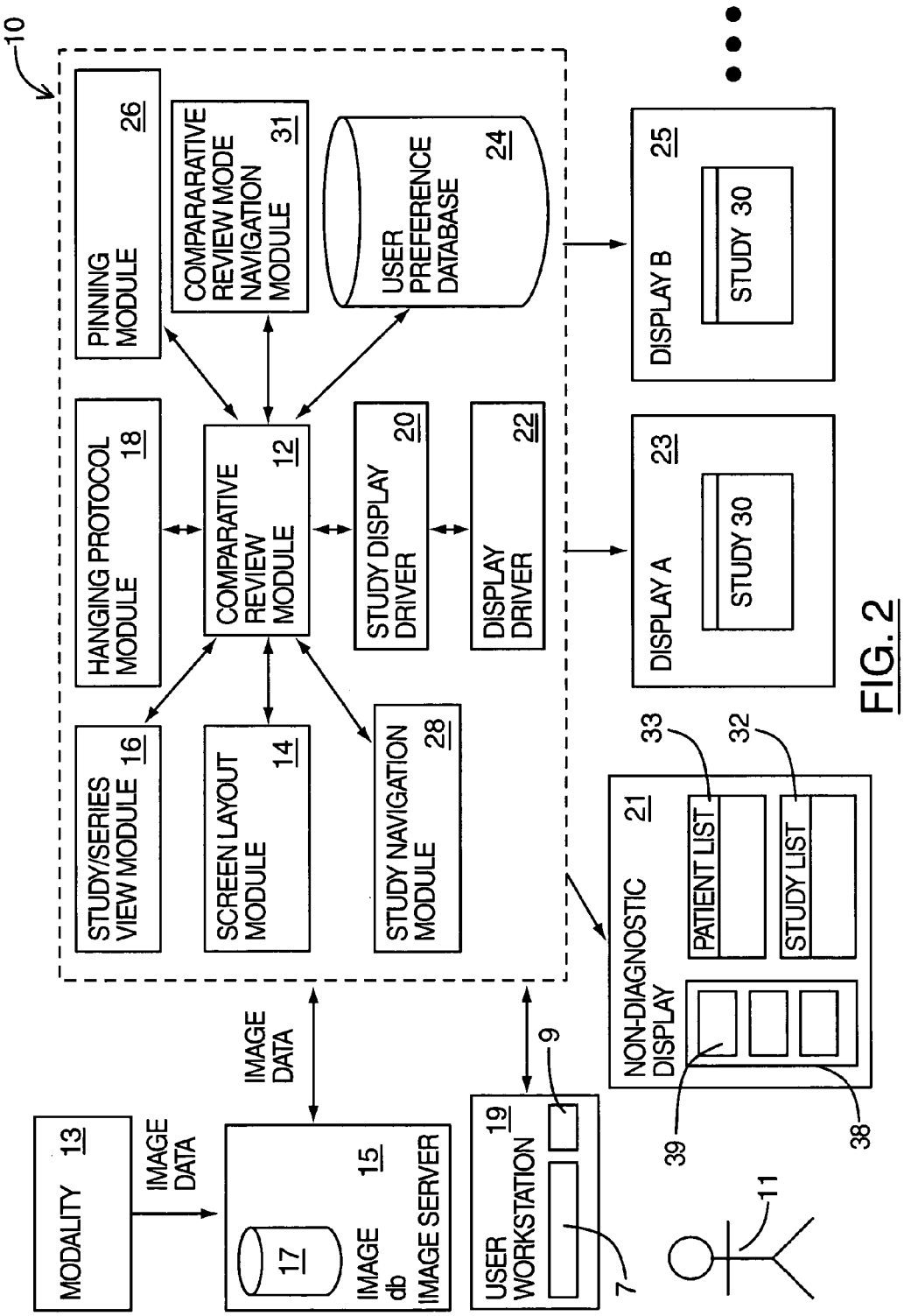
FIG. 2 is a block diagram of the comparative image review system of the present invention.
Figure 3:
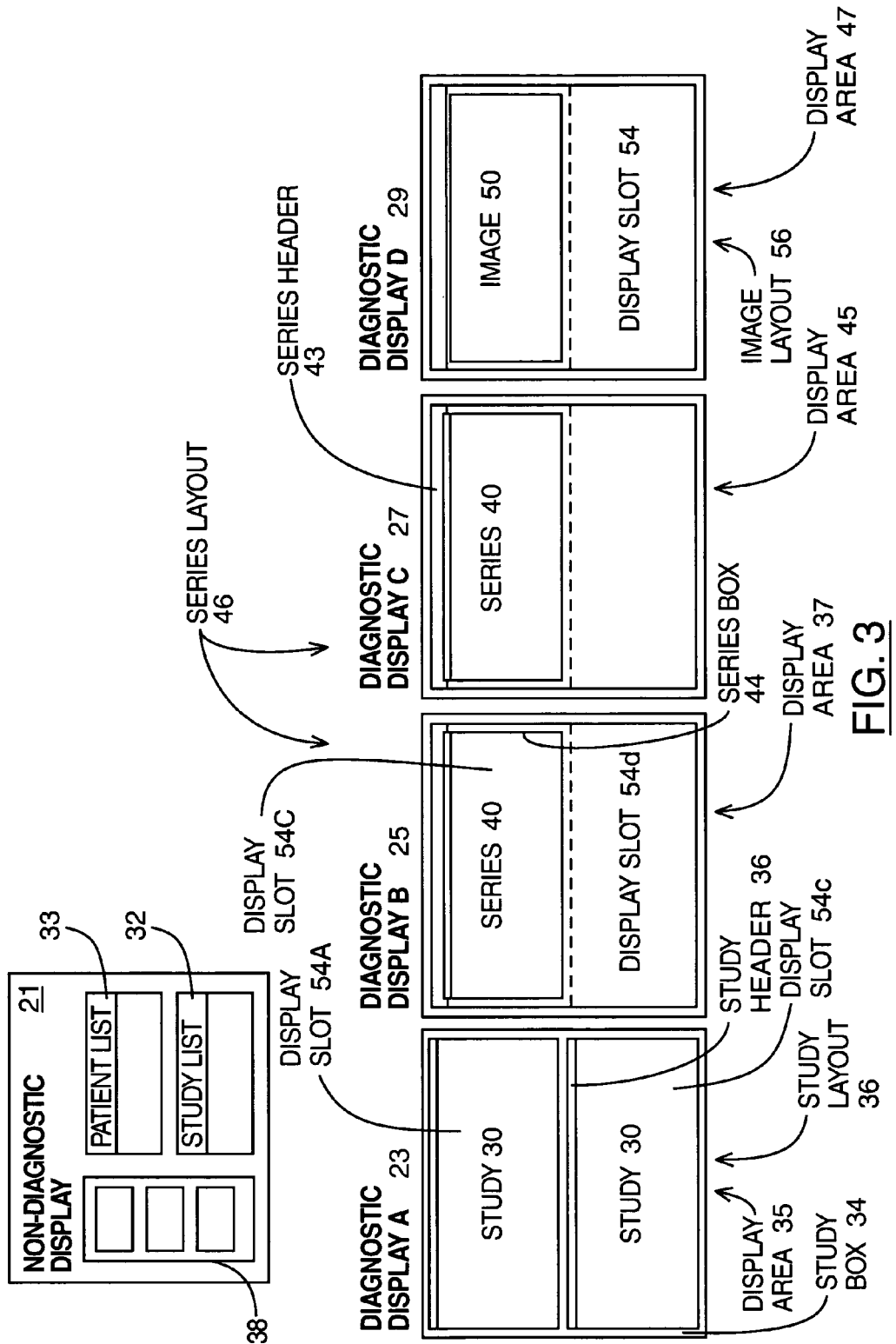
FIG. 3 is a diagram illustrating in more detail how the studies, series and images are represented within the comparative image review system of FIG. 2.

Reference is first made to FIGS. 2 and 3, which illustrates the basic components of a comparative image review system 10 made in accordance with a preferred embodiment of the present invention. Comparative image review system 10 includes a comparative review module 12, a screen layout module 14, a study/series view module 16, a hanging protocol module 18, a pinning module 26, a study display module 20, a comparative review mode (CRM) navigation module 31, study navigation module 28, a display driver 22, and a user preference database 24. Display entities 27 (i.e. medical exams in the form of studies 30, series 40, or images 50) are generated by a modality 13 and stored in an image database 17 on an image server 15 where they can be retrieved by comparative image review system 10. An index of patients is provided by a patient list 33 and an index of studies 30 for a selected patient is provided by a study list 32 both on non-diagnostic display 21. Image display system 10 provides image data associated with studies 30 through display driver 22 to any supported number of diagnostic displays, for example diagnostic displays A 23 and B 25 (FIG. 2) in response to commands issued by a medical practitioner user 11 through user workstation 19.

Comparative review system 10 allows user 11 to create a comparative review sequence within a comparative review sequence menu 38 by selecting from a set of mode icons 39 (FIG. 5) that represent comparative review modes. Each comparative review mode contains a screen layout, study/series views, a hanging protocol and a specified study(ies) (Current or Prior), packaged together. When a comparative review mode is activated within the comparative review sequence, comparative review module 12 must apply a particular screen layout, a study view mode, series view mode, series hanging protocol (per study displayed) and navigation to the particular study(ies) 30. Comparative image review system 10 then allows user 11 to display and navigate through study(ies) 30 using the created comparative review sequence for efficient examination and comparison of medical images from current and/or prior study(ies) 30.

User workstation 19 includes a keyboard 7 and a user-pointing device 9 (e.g. mouse) as shown in FIG. 2. It should be understood that user workstation 19 can be implemented by any wired or wireless personal computing device with input and display means (e.g. conventional personal computer, laptop computing device, personal digital assistant (PDA), etc.) User workstation 19 is operatively connected to non-diagnostic display 21, diagnostic display A 23 and diagnostic display B 25. Image display system 10 is used to provide image display formatting depending on user inputs through user workstation 19 and user pointing device 9. Image display system 10 is installed either on the hard drive of user workstation 19 and/or on image server 15 such that user workstation 19 works with image server 15 in a client-server configuration.

It should be understood that non-diagnostic display 21 and diagnostic displays A 23 and B 25 are preferably controlled and connected to the same processing platform. This processing platform must provide high speed processing and support at least two video cards (i.e. a regular video card for non-diagnostic display 21 and a high performance video graphics card for diagnostic displays A 23 and B 25).

Non-diagnostic display 21 is optimized for study 30 selection and provides a user 11 with a patient list 33 and a study list 32 (FIG. 2). Patient list 33 provides a textual format listing of patients for which studies 30 are available for display. Study list 32 provides a textual format listing of display entities 27 (e.g. studies 30) that are available for display for the selected patient. Study list 32 also includes associated identifying indicia (e.g. body part, modality, etc.) and organizes studies 30 in current and prior study categories. Typically, user 11 will review study list 32 and select listed studies 30. When user 11 selects a study 30, the selected study 30 is displayed on diagnostic display A 23 or diagnostic display B 25, according to an active comparative review mode as will be discussed. Other associated textual information (e.g. patient information, image resolution quality, date of image capture, etc.) is simultaneously displayed within study list 32 to assist the user 11 in selection of studies 30 for a particular patient. Non-diagnostic display 21 is preferably implemented using a conventional color computer monitor (e.g. a color monitor with a resolution of 1024×768). As discussed above, high resolution graphics are not necessary for non-diagnostic display 21 since this display is only displaying textual information to user 11.

Diagnostic display A 23 provides high resolution image display of display entities 27 (e.g. studies 30) to user 11 on display area 35 (FIG. 3). The studies 30 displayed on primary diagnostic display 23 are typically a current study 30 (i.e. image data from "today's" exam). A current study 30 is defined as being the oldest unread study 30 within the study worklist 32 for a patient. As shown in FIG. 3, studies 30, series 40 and images 50 are displayed within study boxes 34 defined within display area 35 and having a study header 36. Also, series 40 are displayed within series boxes 44 defined within display areas 35, 37 and having a series header 41 (FIG. 3). Study boxes 34 and series boxes 44 have variable dimensions and are defined according to a study layout 36 and a series layout 46. In the following disclosure it will be understood that the term "study 30" will refer to a study 30 in combination with study box 34 and study header 36 and that the term "series 40" will refer to a series 40 in combination with series box 44 and a series header 41. Also, studies 30, series 40 and images 50 are all positioned within display slots 54 (FIG. 3), as will be described. Diagnostic display A 23 is preferably implemented using a medical imaging quality display monitor with a relatively high resolution typically used for viewing CT and MR studies (e.g. black and white "reading" monitors with a resolution of 1280-1024 and up).

Diagnostic display B 25 provides high resolution image display of study 30 to user 11 on display area 37 (FIG. 3). Diagnostic display B 25 is typically used by user 11 to display another set of display entities 27 (e.g. studies 30 from a prior study) for comparison with the set of display entities 27 (e.g. studies 30 from a current study) shown on diagnostic display A 23. A prior study 30 is generally defined as having the status "Dictated", "Reported" or "Approved" which means that user 11 has reviewed the prior study 30 and made some action on it subsequently. However, it is also possible that merely different series from the same study 30 would be displayed on diagnostic displays A 23 and B 25. As with diagnostic display A 23, diagnostic display B 25 is preferably implemented using medical imaging quality display monitors with relatively high resolution typically used for viewing CT and MR studies (e.g. black and white "reading" monitors with a resolution of 1280-1024 and up).

It has been determined that the left to right positioning of non-diagnostic display 21 and diagnostic displays A 23 and B 25 as shown in FIG. 3 is generally preferred by medical practitioner users 11 since it allows the eye to flow from left to right, from non-diagnostic display 21 to the diagnostic displays A 23, and B 25. Another popular display configuration is to use four diagnostic displays A 23, B 25, C 27, and D 29 (e.g. FIG. 6C) wherein views are displayed within display areas 35, 37, 45, and 47, respectively. It should be understood that many other types of display configurations could be utilized within image display system 10 and any number of diagnostic displays could be used. Specifically, while comparative image review system 10 will be discussed in respect of two or four diagnostic displays A 23, B 25, alone or together with C 27 and D 29, it should be understood that comparative image review system 10 can be adapted to display studies 30 on any supported number of diagnostic displays. Comparative review modes will cause certain views to be displayed in accordance with how defined screen layouts, study view modes, and hanging protocols behave on such supported display configurations.

Display driver 22 is a conventional display screen driver implemented using commercially available hardware and software. Display driver 22 ensures that display entity 27 is displayed in a proper format on diagnostic display A 23 or diagnostic display B 25 as shown in FIG. 3. Specifically, one or more display entities 27 (i.e. studies 30, series 40 and/or images 50) are displayed within study boxes 34 and/or series boxes 44 that in turn are defined within image area 35. Display driver 22 provides image data associated with study 30 appropriately formatted so that study 30 are properly displayed within one or more study boxes 34 and series 40 are properly displayed within one or more series boxes 44.

Modality 13 is any conventional image data generating device (e.g. X-RAY equipment, Computed Tomography (CT) scanners, etc.) utilized to generate image data that corresponds to patient medical exams. A medical practitioner utilizes the image data generated by modality 13 to make a medical diagnosis (e.g. for investigating the presence or absence of a diseased part or an injury or for ascertaining the characteristics of the diseased part or the injury). Modalities 13 may be positioned in a single location or facility, such as a medical facility, or may be remote from one another. Image data from modality 13 is stored within image database 17 on image server 15 as conventionally known.

Comparative review module 12 coordinates the activities of screen layout module 14, study/series view module 16, hanging protocol module 18, study display module 20, CRM navigation module 31, and pinning module 26 in response to commands sent by user 11 from user workstation 19, comparative review modes and user preferences stored in user display preference database 24. Comparative review module 12 allows a user 11 to create a comparative review sequence (FIG. 5) from a set of comparative review modes using comparative review sequence menu 38 and mode icons 39 that can be manipulated (e.g. "drag and dropped" into the comparative review sequence menu 38) by user 11.

A comparative review mode is a collection of presentation settings that provide an effective combination of a screen layout, study and series view modes and a hanging protocol to provide display of a study(ies) 30. Each comparative review mode has its own associated screen layout, study and series view modes, and hanging protocol. When a comparative review mode is activated within a comparative review sequence, comparative review module 12 applies a particular screen layout, a study view mode, a series view mode, a series hanging protocol (per study displayed), a pinning protocol and navigation to specific study(ies) 30. These actions are all performed and coordinated in a seamless fashion so that they appear to the user 11 to be a single operation.

As discussed, each mode icon 39 represents a comparative review mode. Mode icons 39 include a visual representation of the views of the images as well as the screen layout (FIGS. 8A, 8B, 8C) to assist user 11 in selection and arrangement of comparative review sequence. Once a comparative review sequence is created by user 11 then comparative review module 12 interacts with CRM navigation module 31 to provide user 11 with an interactive comparative review of studies 30, series 40 and images 50 as will be described.

Screen layout module 14 is utilized by comparative review module 12 to define how display entities 27 (i.e. studies 30, series 40 and images 50) are to be arranged and displayed on diagnostic display A or B 23, 25. A screen layout is comprised of three components, namely: the number of studies 30 to display, the number of series 40 to display and the number of images 50 to display. Studies 30, series 40, and images 50 are all positioned within at least one display slot 54 within each display area 35, 37, 45, and 47 according to this definition. Each number is specified in terms of arrangements in rows and columns of the studies 30, series 40 and/or images 50 in the format (n×m) where n is the number of study/series/image rows and m is the number of study/series/image columns, respectively. It can also be seen that the number of display slots 54 per display area can be calculated by multiplying the values n and m.

Accordingly, the screen layout for a particular comparative review mode includes a study layout 36 of A×B where A and B represent the number of rows and columns that the selected study(ies) 30 are to be displayed in. The screen layout will also include a series layout of C×D where C and D represent the number of rows and columns that the series 40 of the selected studies 30 are to be displayed in. Finally, the screen layout will also include an image layout of E×F where E and F represent the number of rows and columns that the image(s) 50 of the series 40 of the selected studies 30 are to be displayed in. Examples of different screen layouts will be discussed.

Study/series view module 16 is utilized by comparative review module 12 to determine how the study(ies) 30 and series 40 of a patient are to be arranged across diagnostic displays A 23, B 25 etc. for a given screen layout. Study/series view module 16 preferably implements three study view modes, namely: "SPAN ONE SCREEN", "SPAN TWO SCREENS" and "SPAN ALL SCREENS", although it should be understood that many other study view modes could be implemented. The latter two modes are also referred to as multi-screen study view modes as they allow a study 30 to span more than one display.

When the SPAN ONE SCREEN study view mode is utilized, each display slot 54 of the screen layout will span only one display. When the SPAN TWO SCREENS study view mode is utilized, each display slot 54 of the screen layout will span two displays. When the SPAN ALL SCREENS study view mode is utilized, each display slot 54 of the screen layout will span the available screens. Also, study/series view module 16 preferably implements two series view modes, namely A|A and A|B series view modes. The A|A series view mode provides for only one series 40 to be displayed across display slots 54 of a screen layout, over the available screens (as limited by the study view mode). The A|B series view mode provides for different series 40 to be displayed in the display slots 54 of a screen layout, over the available screens (as limited by the study view mode).

Hanging protocol module 18 is used by comparative review module 12 to implement the hanging protocol associated with each comparative review mode. As discussed above, a hanging protocol is a mapping that defines a particular order of series 40 according to certain series attributes (e.g. radiographic view, etc.) Hanging protocol module 18 utilizes a hanging protocol associated with an active comparative review mode to determine in which order various series 40 of study(ies) 30 are to be arranged on diagnostic displays A 23 and B 25, etc. Specifically, hanging protocol module 18 applies a defined hanging protocol and automatically arranges various series 40 of a study 30 within display slots 54 previously defined by a screen layout according to the ordering defined by the hanging protocol.

Pinning module 26 is utilized by comparative review module 12 to pin a selected study 30. Pinning module 26 ensures that any study 30 that has been pinned in a display slot 54 of a screen layout will remain in that display slot 54 during any subsequent study navigation. A visual marker ("*") is generated to indicate which study 30 is pinned (i.e. not changing with navigation). Only by unpinning the pinned study 30 from that display slot 54 can another study 30 be displayed in that slot (by any means of study navigation). The study pinning feature is typically only applied to current study(ies) 30 (i.e. studies 30 which have not yet been dictated) and allows user 11 to keep track of the current study 30 while navigating through prior studies 30.

Study display module 20 is utilized by comparative review module 12 to retrieve image data from image server 15 associated with a selected study 30, series 40 or image 50 for display on diagnostic displays A and B 23 and 25 according to the active comparative review mode. The particular initial views and their relative arrangement are determined on the basis of the active comparative review mode as will be described. When user 11 selects a patient from patient list 33 and then launches associated study(ies) 30 from study list 32 on non-diagnostic display 21, study display module 20 retrieves image data that corresponds to the selected study(ies) 30 and provides it to comparative review module 12. Comparative review module 12 in turn applies the screen layout, the study view mode, and the hanging protocol associated with the active comparative review mode to the selected study 30. Study display module 20 then instructs display driver 22 to display the suitably formatted selected study(ies) 30 on diagnostic displays A 23, B 25, etc.

Figure 5:
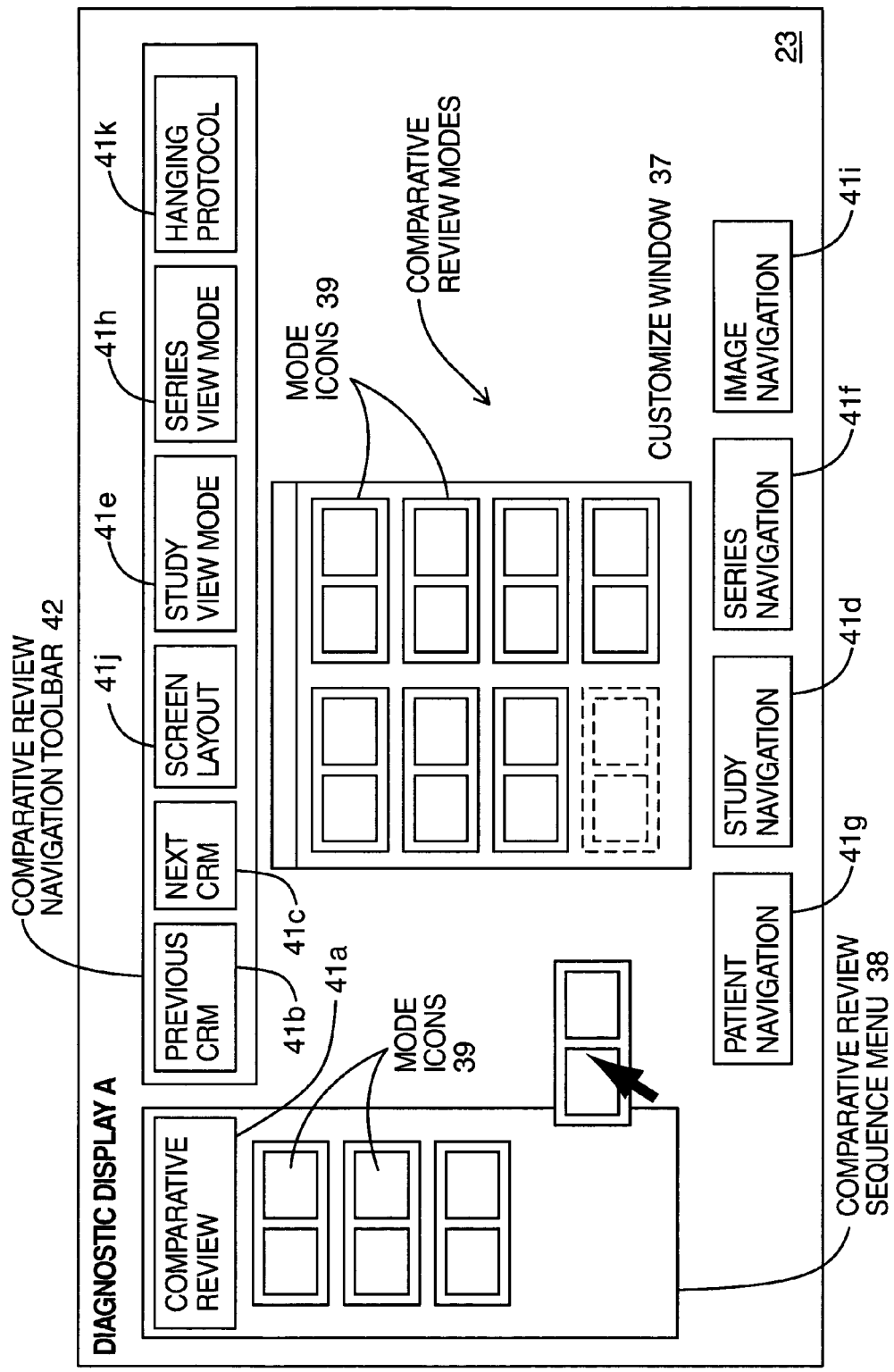
FIG. 5 is a schematic diagram illustrating how a user can create a comparative review sequence using the customize window and the comparative review sequence menu and how a user can conduct comparative review mode and study navigation using the comparative review navigation toolbar of FIG. 2.

CRM navigation module 31 is utilized by comparative review module 12 to navigate the various comparative review modes once the studies 30, series 40 and images 50 have been displayed on non-diagnostic display A and B 23, 25. CRM navigational module 31 provides user 11 with the ability to cycle through comparative review modes when performing an examination. Specifically, user 11 is provided with a comparative review navigation toolbar 42 that includes various navigation tools 41. Specifically, the NEXT CRM button 41c, PREVIOUS CRM button 41b, STUDY VIEW MODE button 41e, and SERIES VIEW MODE button 41h are provided (FIG. 5). PREVIOUS CRM and NEXT CRM buttons 41b, 41c allow for navigation to the next or previous comparative review mode within the comparative review sequence, respectively. STUDY VIEW MODE and SERIES VIEW MODE buttons 41e, 41h allow the user 11 to change the study and series view modes being displayed, respectively. Navigation tools 41 are also preferably associated with keyboard shortcuts to assist the user 11 to quickly navigate within comparative review.

Study navigation module 28 allows provides for patient, study, series and image navigation. Specifically, as shown in FIG. 5, user 11 is provided with additional navigation tools, namely PATIENT NAVIGATION button 41g, STUDY NAVIGATION button 41d, SERIES NAVIGATION button 41f and IMAGE NAVIGATION button 41i. The PATIENT NAVIGATION button 41g allows user 11 to query and select a particular patient from patient list 33. The STUDY NAVIGATION button 41g allow user 11 to query and select one or more study(ies) 30 for a particular patient from study list 32. Finally, SERIES and IMAGE NAVIGATION buttons 41h and 41i, allow the user 11 to navigate through various series and images for a particular selected study 30. The specific workings of these navigational tools will be described in more detail.

Figure 4:
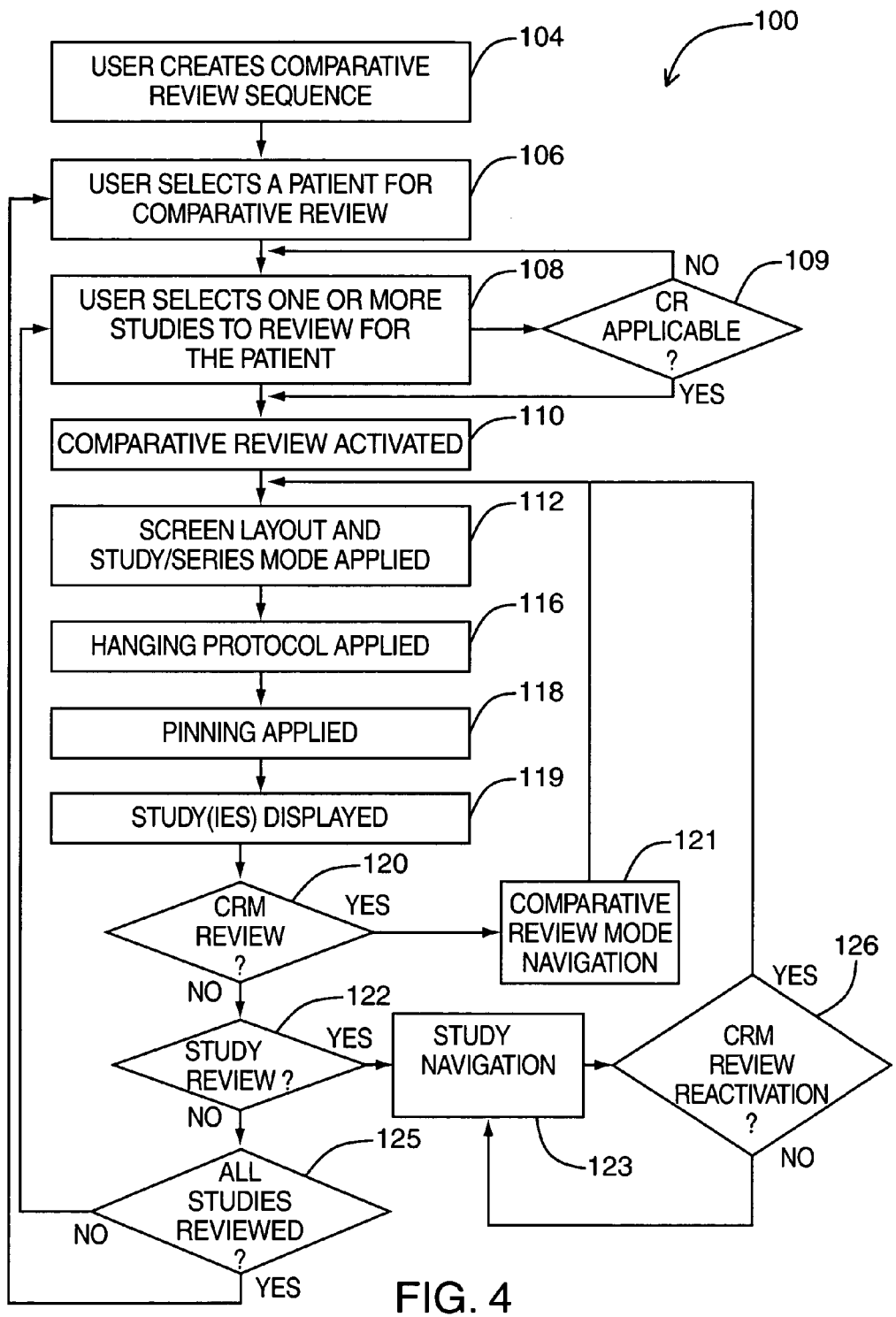
FIG. 4 is a flowchart illustrating the basic operational steps of the comparative image review system of FIG. 2.

Reference is now made to FIGS. 4, 5, 6A to 6F and 7A to 7D. Specifically, FIG. 4 is a flowchart that illustrates the general operational steps 100 executed by comparative image review system 10 and FIGS. 5, 6A to 6F and 7A to 7D together illustrate how comparative review module 12 allows a user 11 to create the comparative review sequence and then display and navigate views within comparative review.

Generally, speaking comparative review module 12 allows user 11 to create a comparative review sequence by selecting certain comparative review modes of interest and positioning them within comparative review sequence menu 38. Then once user 11 selects study(ies) 30 to review and comparative review is found to be applicable and then activated, active and applicable (if any) comparative review modes are applied to the selected study(ies) 30. Preferably, if applicable, a comparative review mode is applied to the most recent study 30 under a default rule, but any particular study(ies) 30 can be specifically selected for comparative review by user 11 by making the appropriate selection from study list 32. Application of the comparative review mode constitutes application of the associated screen layout and study/series view modes and the associated hanging protocol. Once a screen layout is established, the hanging protocol is used to populate the display slots 54 within the established screen layout. In this way the screen layout and the hanging protocol associated with a comparative review mode are interrelated. Pinning of current study(ies) 30 is also preferably performed. Finally, user 11 can navigate through selected study(ies) 30 by evoking different comparative review modes within the sequence. Additionally, user 11 may display additional study(ies) 30 not originally selected for comparative review.

Specifically, at step (104), comparative review module 12 enables user 11 to create a comparative review mode sequence using comparative review sequence menu 38 and mode icons 39 (FIG. 5) which represent different comparative review modes. The generation of the comparative review mode sequence requires the user 11 to select and position desired mode icons 39 within comparative review sequence menu 38 (FIG. 5). User 11 can "drag" a comparative review mode of interest from customize window 37 to comparative review sequence menu 38 and "drop" it into comparative review sequence menu 38 (FIG. 5). Conversely, mode icons 39 can be removed from comparative review sequence menu 38 by "dragging" a comparison review mode of interest out of the comparative review sequence menu 38 and "dropping" it into customize window 37.

As shown, the sequence of comparative review modes within comparative review sequence menu 38 (i.e. pictorially from top to bottom) represents the comparative review mode sequence that will be executed by comparative review mode 12 when activated by user 11. This sequence of comparative review modes also determines which comparative review mode the NEXT CRM and PREVIOUS COMPARATIVE REVIEW MODE navigation tools 41 will cause CRM navigation module 31 (FIG. 5) to apply as will be described.

User 11 can view the various comparative review modes associated with a comparative review sequence and the order in which they are listed, by selecting the COMPARATIVE REVIEW button 41a. When the COMPARATIVE REVIEW tool 41a is selected a "drop down" menu view is provided of the comparative review modes within the sequence. As will be described, an active comparative review mode will be indicated through the use of a recognizable indicia (e.g. shading) and inapplicable comparative review modes will be "grayed" out. This will allow user 11 to determine where they are in the sequence.

User 11 can edit comparative review mode sequence at any time by adding and/or removing various comparative review modes from the sequence. That is, user 11 would add and/or remove mode icons 39 from comparative review sequence menu 38 by suitably selecting mode icon 39 and moving between customize window 37 and comparative review sequence menu 38. While it is preferred for each user 11 to have one comparative review mode sequence, it should be understood that comparative image review system 10 can be adapted to allow a user 11 to create, store and apply any number of comparative review mode sequences.

At step (106), once the comparative review sequence (FIG. 5) has been established, user 11 selects a patient from patient list 33 (FIG. 6A) for comparative review. Study list 32 is then populated with studies 30 that for that particular patient. This requires the loading of all new studies 30, potentially of a different modality and accordingly having different default study view mode and screen layout.

At step (108), the user 11 selects one or more study(ies) 30 from study list 32 to review for the selected patient. Study launching module 18 retrieves the image data from image server 15 associated with the selected study(ies) 30 and provides it to comparative review module 12 for assessment, processing and display, as will be described. As shown in FIG. 4, for each individual patient, comparative review system 10 cycles through steps (108) to (125).

At step (109), comparative review module 12 verifies that the comparative review sequence is applicable to the selected study(ies) 30. A comparative review sequence is applicable if the modality(ies) and body part(s) defined for the sequence (e.g. "MRI", "brain") match those of the selected study(ies) 30. If comparative review module 12 determines that the comparative review sequence is applicable to the selected study(ies) 30, then the applicability of each individual comparative review mode is determined.

Each comparative review mode includes a list of necessary study(ies) 30 that are required for display. The list typically consists of a current study 30, a prior study 30 or both. A comparative review mode is considered applicable if the necessary study(ies) 30 are available for display. Comparative review module 12 considers the selected study(ies) 30 and determines which comparative review modes are applicable and which are inapplicable. The mode icons 39 associated with the inapplicable comparative review modes are then disabled (i.e. "grayed out") within comparative review sequence menu 38 and cannot be selected or utilized for comparative review of the selected study(ies) 30.

Finally, if comparative review module 12 has verified the comparative review sequence for the selected study(ies), then comparative review module 12 obtains the selected study(ies) 30 from study display module 20 and automatically activates comparative review.

At step (110), comparative review module 12 automatically activates comparative review and begins comparative review by activating the first comparative review mode in the sequence or a comparative review mode explicitly chosen by user 11.

Once activated, during steps (112) to (118), comparative review module 20 instructs screen layout module 14, study/series view module 16, hanging protocol module 18, and pinning module 26 to apply the presentation settings associated with the active comparative review mode. That is, the screen layout, study view, series view, hanging protocol, and pinning protocol associated with the comparative review mode are applied to the selected study(ies) 30 and the resulting arrangement of study(ies) 30 is displayed on diagnostic displays A 23 and B 25 etc.

Specifically, at step (112), screen layout module 14 and study/series view module 16 identify the screen layout and the study/series view modes associated with the active comparative review mode.

Figure 6A:
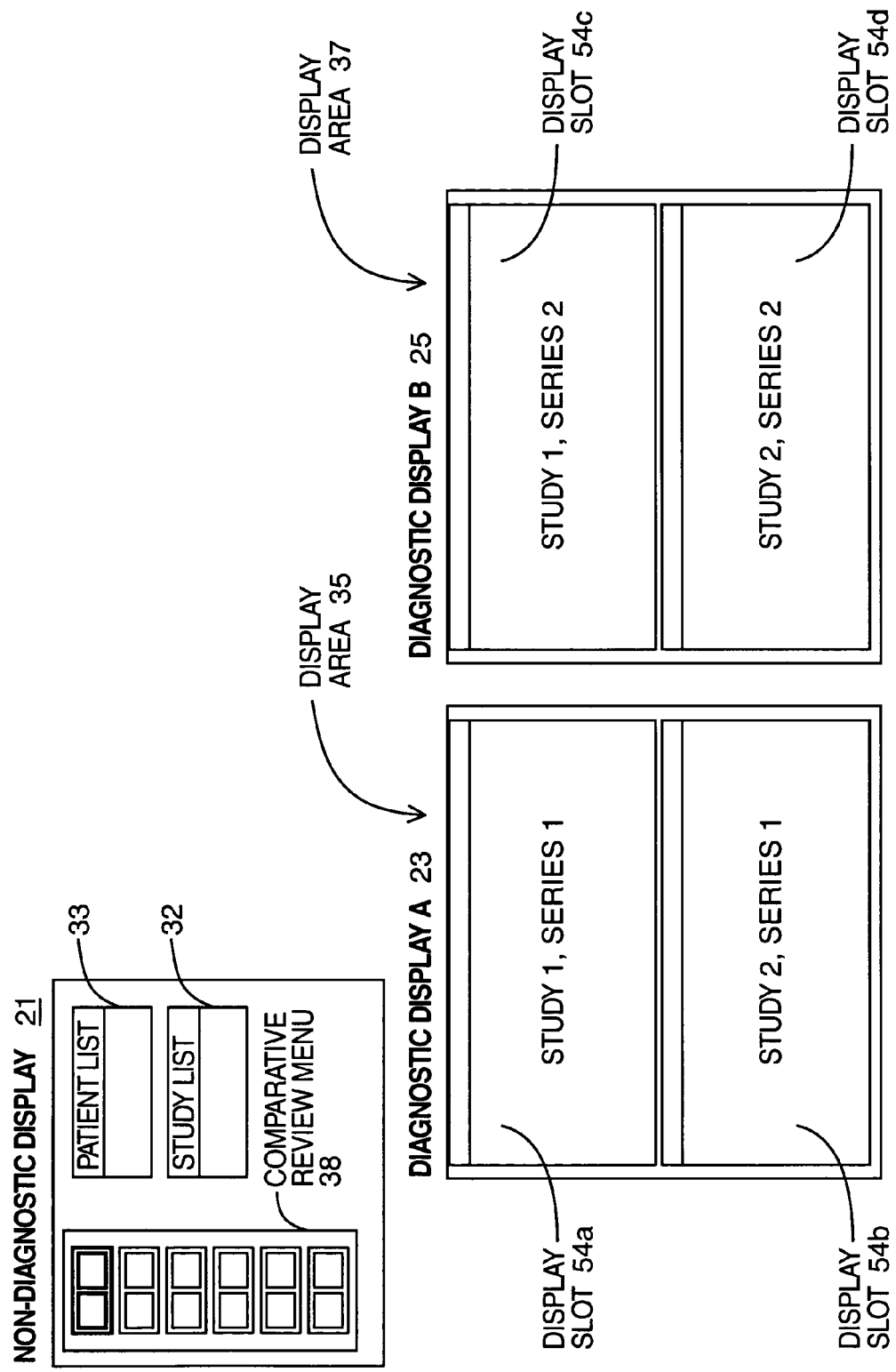
FIGS. 6A to 6F are schematic diagrams illustrating the result of the application of various study and series layouts when used in combination with the SPAN TWO SCREENS study view mode of the comparative image review system of FIG. 2.

Screen layouts include images from current study 30 and/or prior study(ies) 30 and such images are located and displayed within the display slots 54 within a screen layout as shown in FIG. 6A. A screen layout includes defines the display of a number of study(ies) 30 and number of series 40 and a number of images 50 to be displayed within display areas 35, 37, 45, 47, etc., as configured. Specifically, studies 30 are displayed within display areas 35, 37 according to a study layout 36, series 40 are displayed within display areas 35, 37 according to a series layout 46, and images 50 are displayed within display areas 35, 37 according to a image layout 56. As previously noted, study layouts 36, series layouts 46 and image layouts 56 are all specified in terms of rows and columns in the format (n×m) where n is the number of study/series/image rows and m is the number of study/series/image columns.

Study/series view module 16 determines how the studies for a particular patient are displayed across the available displays. Study/series view module 16 identifies the study and series view modes associated with the active comparative review mode and dictates how the series 40 and images 50 of the selected study(ies) 30 at issue are to be displayed at what locations within diagnostic displays A 23 and B 25. The study and series view modes could be applied to a current study 30 and a prior study 30. Again, whether a current study 30 and/or a prior study 30 is to be displayed depends on what study(ies) 30 the user 11 has selected for display and the comparative review mode at issue.

The present discussion of comparative image review system 10 will be directed at three study view modes, namely the SPAN ONE SCREEN, SPAN TWO SCREENS and SPAN ALL SCREENS, although it should be understood that many other study view modes could be defined and implemented by study/series view module 16. As previously discussed, a study view mode determines how the studies 30 of a patient are to be arranged across two or more diagnostic displays (e.g. A 23, B 25, C 27, and D 29) for a given screen layout. When the SPAN ONE SCREEN study view mode is utilized, each display slot 54 of the screen layout will span only one display. When the SPAN TWO SCREENS study view mode is utilized, each display slot 54 of the screen layout will span two displays. When the SPAN ALL SCREENS study view mode is utilized, each display slot 54 of the screen layout will span the available screens.

More specifically, comparative review system 10 is able to provide comparative review functionality in the case of a multi-study screen layout. A multi-study screen layout is a screen layout that is designed to contain and display more than one study 30. For the purpose of this disclosure, two types of multi-study screen layouts are supported, namely those that can be applied across any number of screens (where the same layout is repeated) and those specially designed to be used with only two screens.

When the SPAN TWO SCREENS study view mode is used with a multi-study screen layout, each display slot 54 of the screen layout will span two screens. That is, for example referring back to FIG. 3, the first display slot 54*a* on diagnostic display A 23 and the first display slot 54*c* on display B 25 will be treated as the same display slot 54 and display the series 40 and images 50 belonging to the a first study 30. Similarly, the second display slot 54*b* on diagnostic display A 23, and the second display slot 54*d* on diagnostic display B 25 will be used together to display the images of a second study 30. These spanning display slots 54*a* and 54*c*, and 54*b* and 54*d* are each treated as a single display slot 54 for various study arrangement purposes including series view mode, pinning and active study highlighting. For pinning, when a study 30 is pinned in a display slot 54 on diagnostic display A 23, the study 30 will also be pinned in the corresponding display slot 54 on display B 25. Also, both display slots 54 on both diagnostic display A 23 and B 25 will be highlighted for an active study 30.

Moreover, the present discussion will be directed at two series view modes, namely the A|A series view mode and the A|B series view mode, although it should be understood that many other series view modes could be defined and implemented by study/series view module 16. The series view mode determines how the series 40 of a study 30 are to be displayed across multiple diagnostic displays A 23, B 25 for a given screen layout and study view mode. The A|A series view mode provides for only one series 40 to be displayed in the display slots 54 of a screen layout, over the available screens (as limited by the study view mode). The A|B series view mode provides for different series 40 to be displayed in the display slots 54 of a screen layout, over the available screens (as limited by the study view mode).

The following examples in FIGS. 6A, 6B, 6C, 6D and 6E illustrate the spanning nature of the multi-study layouts of comparative image review system 10 when used with the SPAN TWO SCREENS study view mode.

Figure 6B:
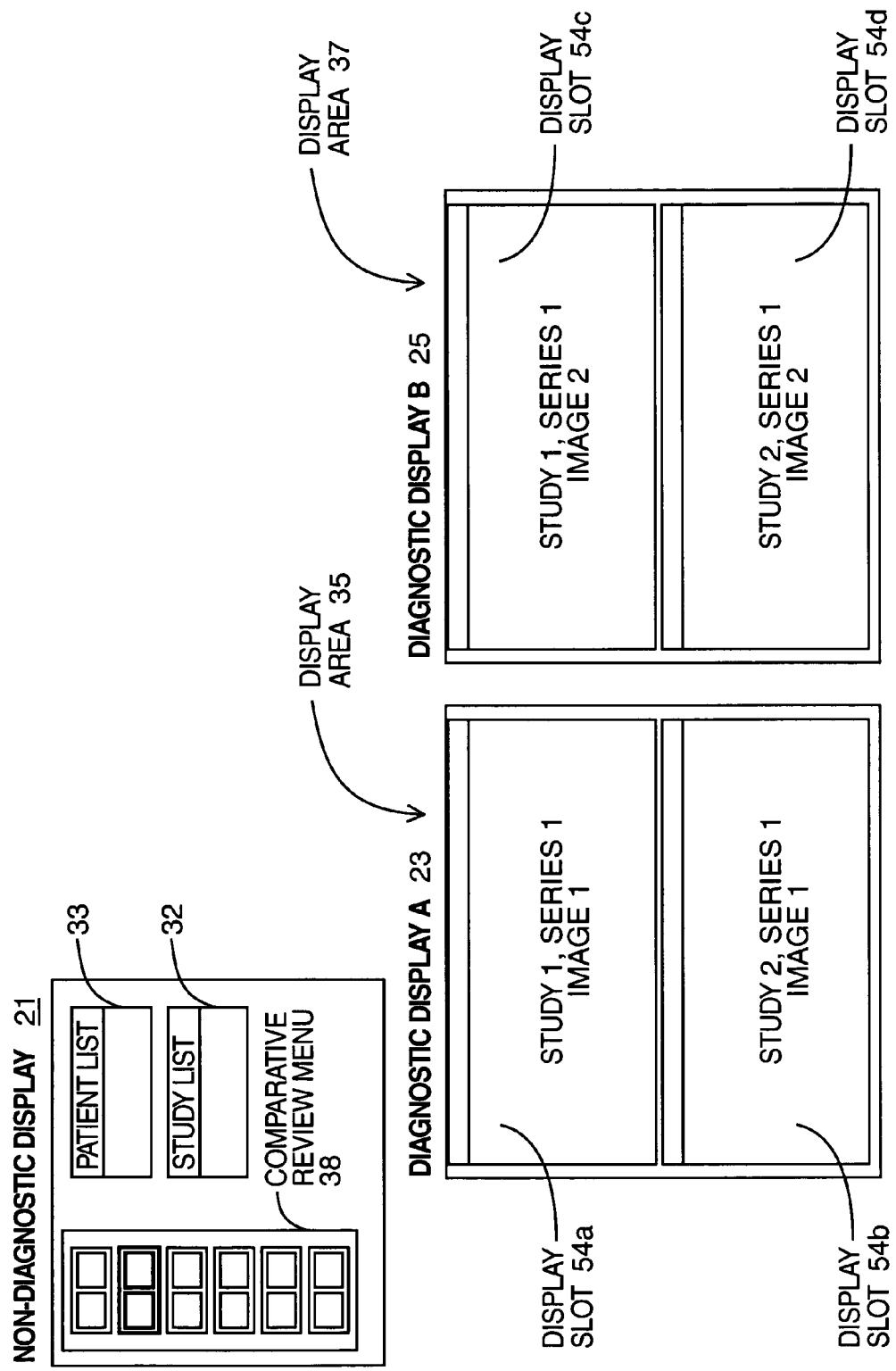

FIG. 6A illustrates a study layout 36 of 2×1 a series layout 46 of 1×1, and an image layout 56 of 1×1 and a study view mode of SPAN TWO SCREENS and a series view mode of A|B for two diagnostic displays A 23, B 25. That is, there are two studies 30, namely study 1 and study 2 (i.e. two rows and one column of studies 30) shown on each diagnostic display A 23, B 25 as shown in FIG. 6B. Also, there is only one series 40 of each study (i.e. one row and one column of series 40) per diagnostic display A 23, B 25 as shown. Finally, there is only one image 50 (i.e. one row and one column of images 50) per diagnostic display A 23, B 25.

Since the study mode is SPAN TWO SCREENS, each study 30 is displayed over the two displays A 23, B 25 in corresponding display slots 54. Specifically, study 1 is displayed in display slots 54*a* and 54*c* and study 2 is displayed in display slots 54*b* and 54*d*. Also, since the series view mode is A|B, different series 40 are displayed in the display slots 54 of the screen layout, over the available screens. Specifically, series 1 and series 2 of study 1 are displayed in display slots 54*a* and 54*c*, respectively. Also, series 1 and series 2 of study 2 are displayed in display slots 54*b* and 54*d*, respectively.

FIG. 6B illustrates a study layout 36 of 2×1 a series layout 46 of 1×1, and an image layout 56 of 1×1 and a study view mode of SPAN TWO SCREENS and a series view mode of A|A for two diagnostic displays A 23, B 25. That is, there are two studies 30 (i.e. two rows and one column of studies 30) shown on each display A 23, B 25 as shown in FIG. 6B. Also, there is only one series 40 (i.e. one row and one column of series 40) per diagnostic display A 23, B 25 as shown. Finally, there is only one image 50 (i.e. one row and one column of images 50) per diagnostic display A 23, B 25.

Since the study mode is SPAN TWO SCREENS, each study 30 is displayed over the two displays A 23, B 25 in corresponding display slots 54. Specifically, study 1 is displayed in display slots 54*a* and 54*c* and study 2 is displayed in display slots 54*b* and 54*d*. Also, since the series view mode is A|A, for each study 30, images from the same series 40 are displayed in the display slots 54 of the screen layout, over the available screens (as limited by the study view mode). Accordingly, for each series 40, different images 50 from the series 40 (since different views are to be compared) are displayed across diagnostic displays A 23, and B 25 instead. Specifically, image 1 and image 2 of series 1 of study 1 are displayed in display slots 54*a* and 54*c*, respectively. Also, image 1 and image 2 of series 1 of study 2 are displayed in display slots 54*b* and 54*d*, respectively.

Figure 6C:
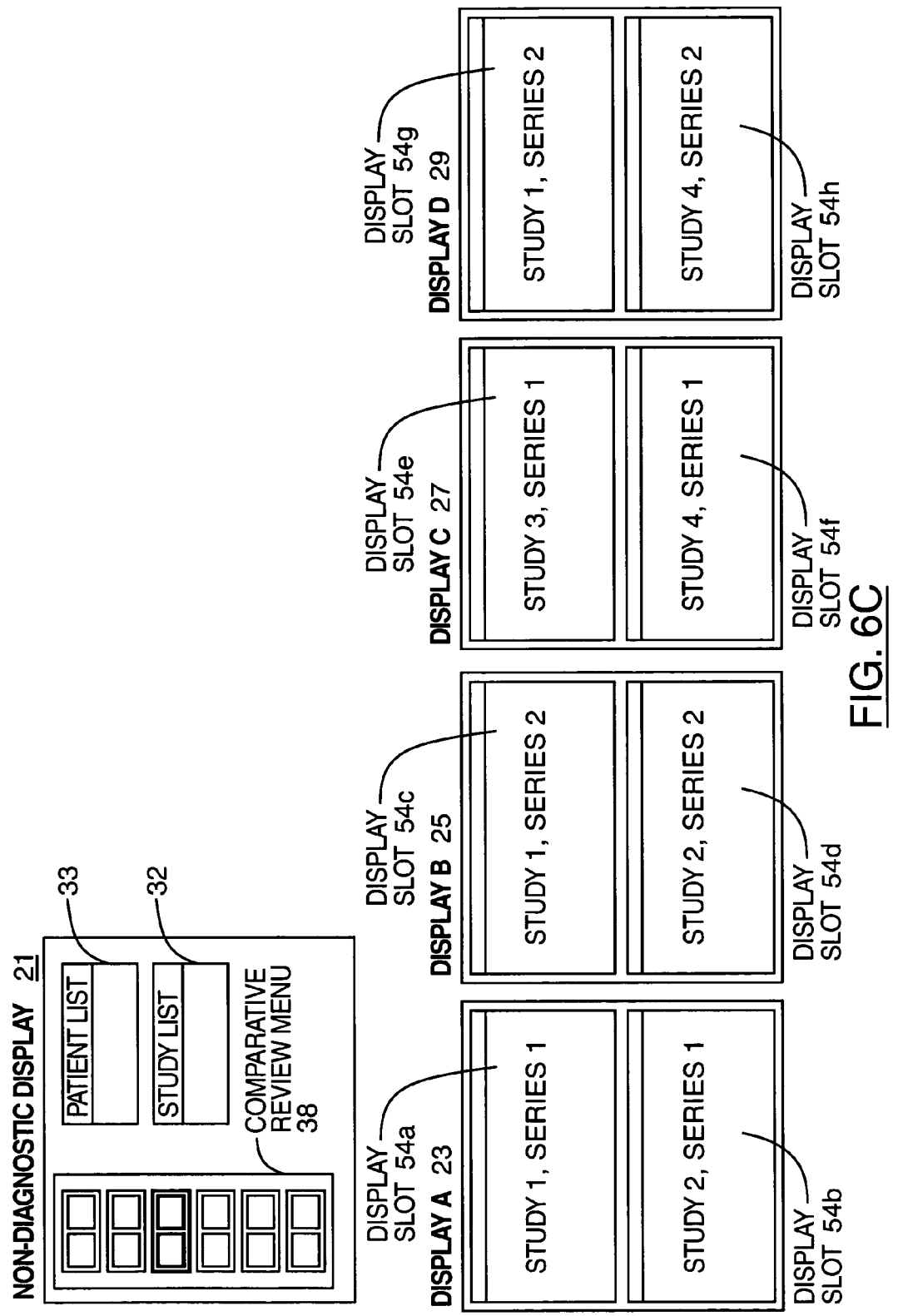

FIG. 6C illustrates a study layout 36 of 2×1, a series layout 46 of 1×1 and an image layout 56 of 1×1 for display and a study view mode of SPAN TWO SCREENS and a series view mode of A|B for four displays A 23, B 25, C 27, D 29 as shown. That is, there are two studies 30 (i.e. two rows and one column of studies 30) shown on each diagnostic display A 23, B 25, C 27, D 29. Also, there is only one series 40 (i.e. one row and one column of series 40) for each study 30 per diagnostic display A 23, B 25, C 27, D 29 as shown. Finally, there is only one image 50 (i.e. one row and one column of series 50) per series 40 on each diagnostic display A 23, B 25, C 27, D 29.

Since the study mode is SPAN TWO SCREENS, each display slot 54 of the screen layout will span two screens and each study 30 will be displayed over two of the four displays A 23, B 25, C 27, and D 29 in corresponding display slots 54. Specifically, study 1 is displayed in display slots 54*a* and 54*c*, study 2 is displayed in display slots 54*b* and 54*d*, study 3 is displayed in display slots 54*e* and 54*g*, and study 4 is displayed in display slots 54*f* and 54*h*. Also, since the series view mode is A|B, images from different series 40 for each study 30 are displayed in the display slots 54 of the screen layout for diagnostic displays A 23, B 25 and diagnostic displays C 27, D 29. Accordingly, display slot 54*a* is treated as the same display slot as display slot 54*c* and is used to display series 1 and series 2 belonging to the same study 1. Also, display slot 54*b* is treated as the same display slot as display slot 54*d* and is used to display series 1 and series 2 belonging to the same study 2. Display slot 54e is treated as the same display slot as display slot 54g and is used to display series 1 and 2 belonging to the same study 3. Finally, display slot 54f is treated as the same display slot as display slot 54h and is used to display series 1 and series 2 belonging to the same study 4.

Figure 6D:
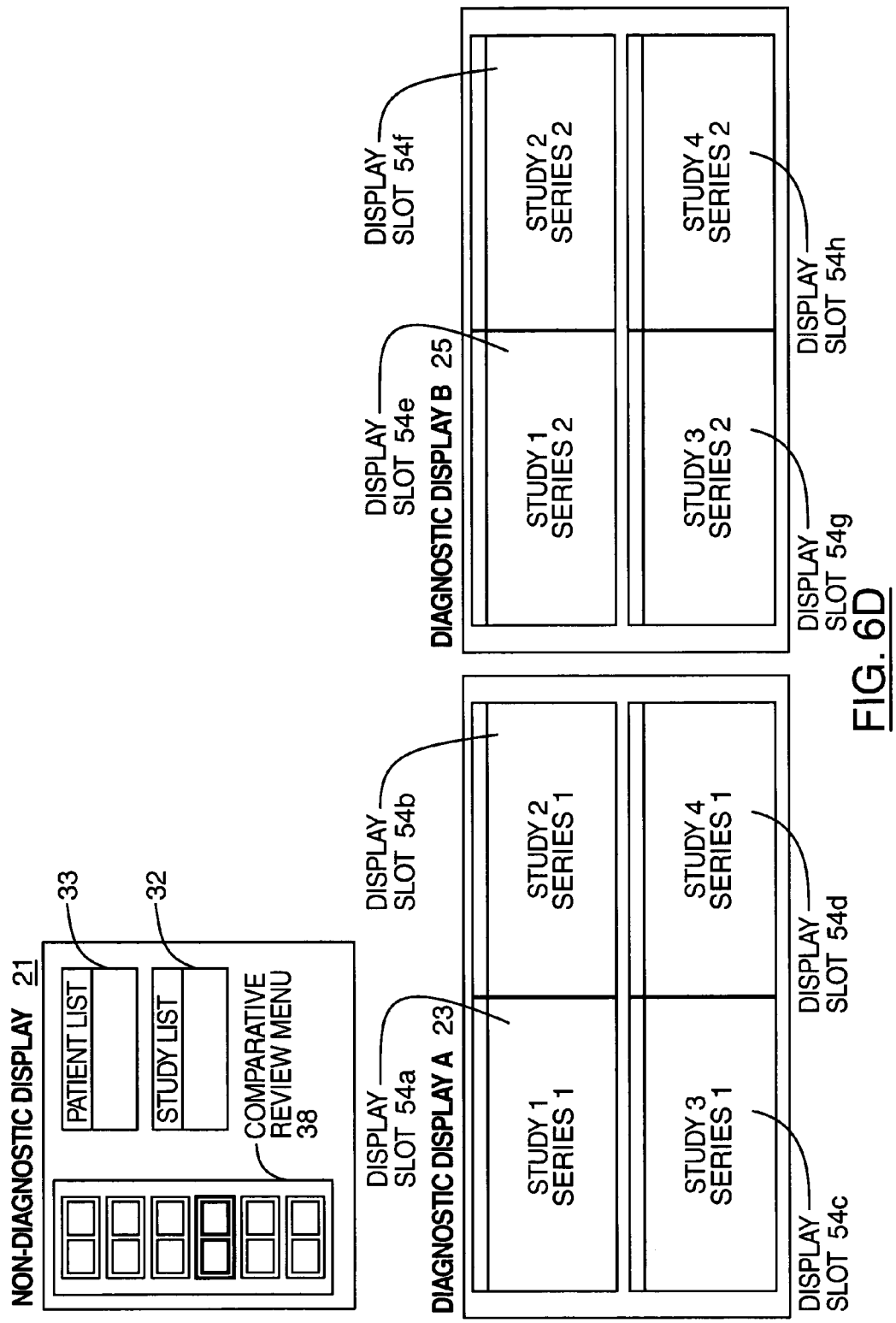

FIG. 6D illustrates a study layout 36 of 2×2, a series layout 46 of 1×1, and an image layout 56 of 1×1, a study view mode of SPAN TWO SCREENS and a series view mode of A|B for two diagnostic displays A 23, B 25. That is, there are four studies 30 (namely study 1, study 2, study 3, and study 4) (i.e. two rows and two columns of studies 30) shown on each diagnostic display A 23, B 25. Also, there is only one series 40 (i.e. one row and one column of series 40) per diagnostic display A 23, B 25 as shown. Finally, there is only one image 50 (i.e. one row and one column of series 50) per diagnostic display A 23, B 25.

Since the study mode is SPAN TWO SCREENS, the same four studies 30 are displayed on two diagnostic displays A 23, B 25. Specifically, study 1 is displayed in display slots 54a and 54e, study 2 is displayed in display slots 54b and 54f, study 3 is displayed in display slots 54c and 54g, and study 4 is displayed in display slots 54d and 54h. Also, since the series view mode is A|B, two different series 40 for each study 30 are displayed in the display slots 54 of the screen layout. Accordingly, display slot 54a is treated as the same display slot as display slot 54e and is used to display series 1 and series 2 belonging to the same study 1. Also, display slot 54b is treated as the same display slot as display slot 54f and is used to display series 1 and series 2 belonging to the same study 2. Display slot 54c is treated as the same display slot as display slot 54g and is used to display series 1 and 2 belonging to the same study 3. Finally, display slot 54d is treated as the same display slot as display slot 54h and is used to display series 1 and series 2 belonging to the same study 4.

Figure 6E:
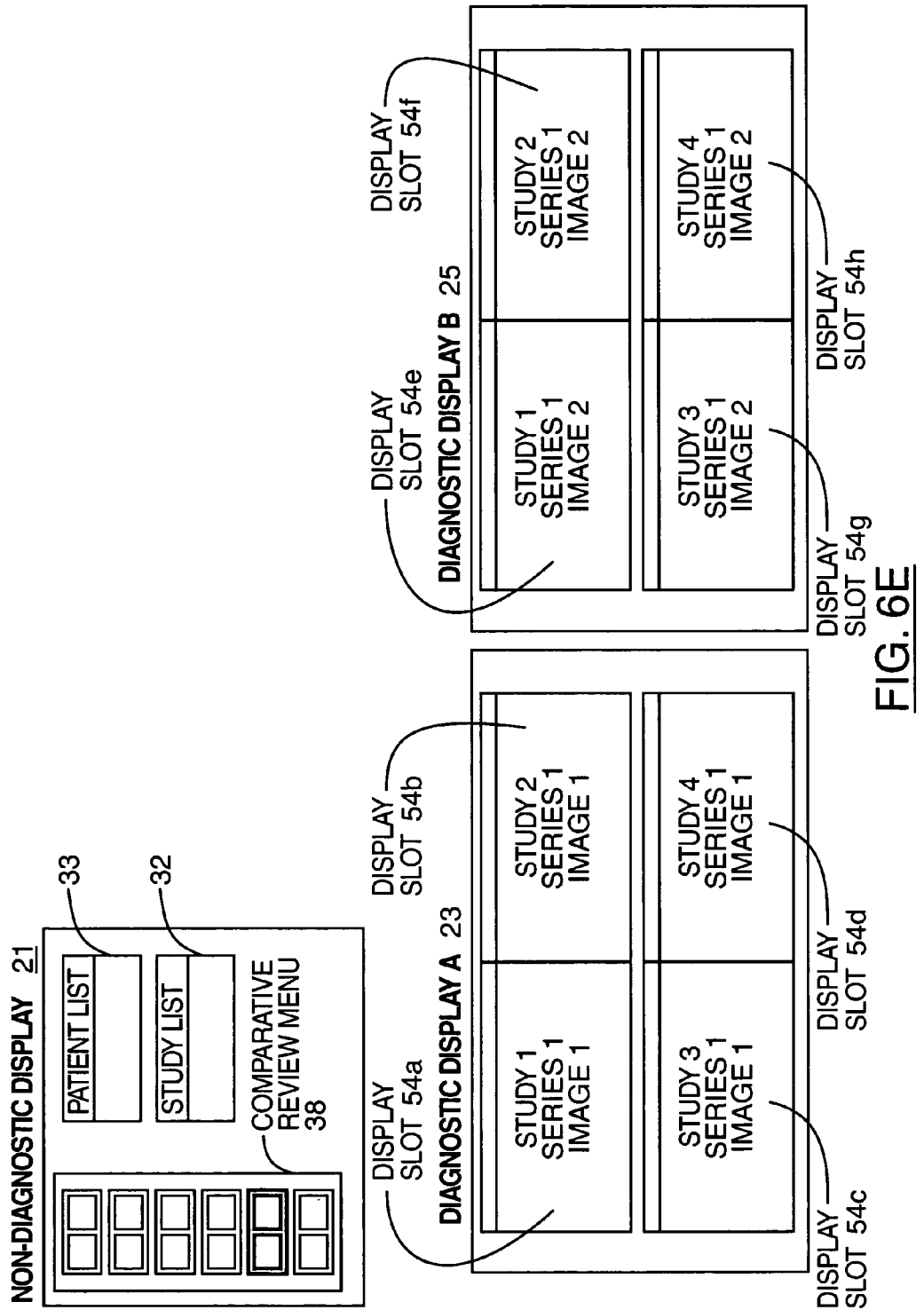

FIG. 6E illustrates a study layout 36 of 2×2, a series layout 46 of 1×1 and an image layout 56 of 1×1 and a study view mode of SPAN TWO SCREENS and a series view mode of A|A for two displays 23, 25. That is, there are four studies 30 (i.e. two rows and two columns of studies 30) shown on each diagnostic display A 23, B 25. Also, there is only one series 40 (i.e. one row and one column of series 40) per display A 23, B 25 as shown. Finally, there is only one image 50 (i.e. one row and one column of series 50) per diagnostic display A 23, B 25.

Since the study mode is SPAN TWO SCREENS, the same four studies 30 are displayed on two diagnostic displays A 23, B 25. Specifically, study 1 is displayed in display slots 54a and 54e, study 2 is displayed in display slots 54b and 54f, study 3 is displayed in display slots 54c and 54g, and study 4 is displayed in display slots 54d and 54h. Also, since the series view mode is A|A, the same series 40 for each study 30 is displayed in corresponding display slots 54 of the screen layout. Since comparative review system 10 is designed to provide different images for comparison review, different images of the same series 40 for a study 30 can be displayed in corresponding display slots 54 instead. Accordingly, display slot 54a is treated as the same display slot as display slot 54e and is used to display image 1 and image 2 of series 1 of study 1. Also, display slot 54b is treated as the same display slot as display slot 54f and is used to display image 1 and image 2 of series 1 of study 2. Display slot 54c is treated as the same display slot as display slot 54g and is used to display image 1 and image 2 of series 1 of study 3. Finally, display slot 54d is treated as the same display slot as display slot 54h and is used to display image 1 and image 2 of series 1 of study 4.

Figure 6F:
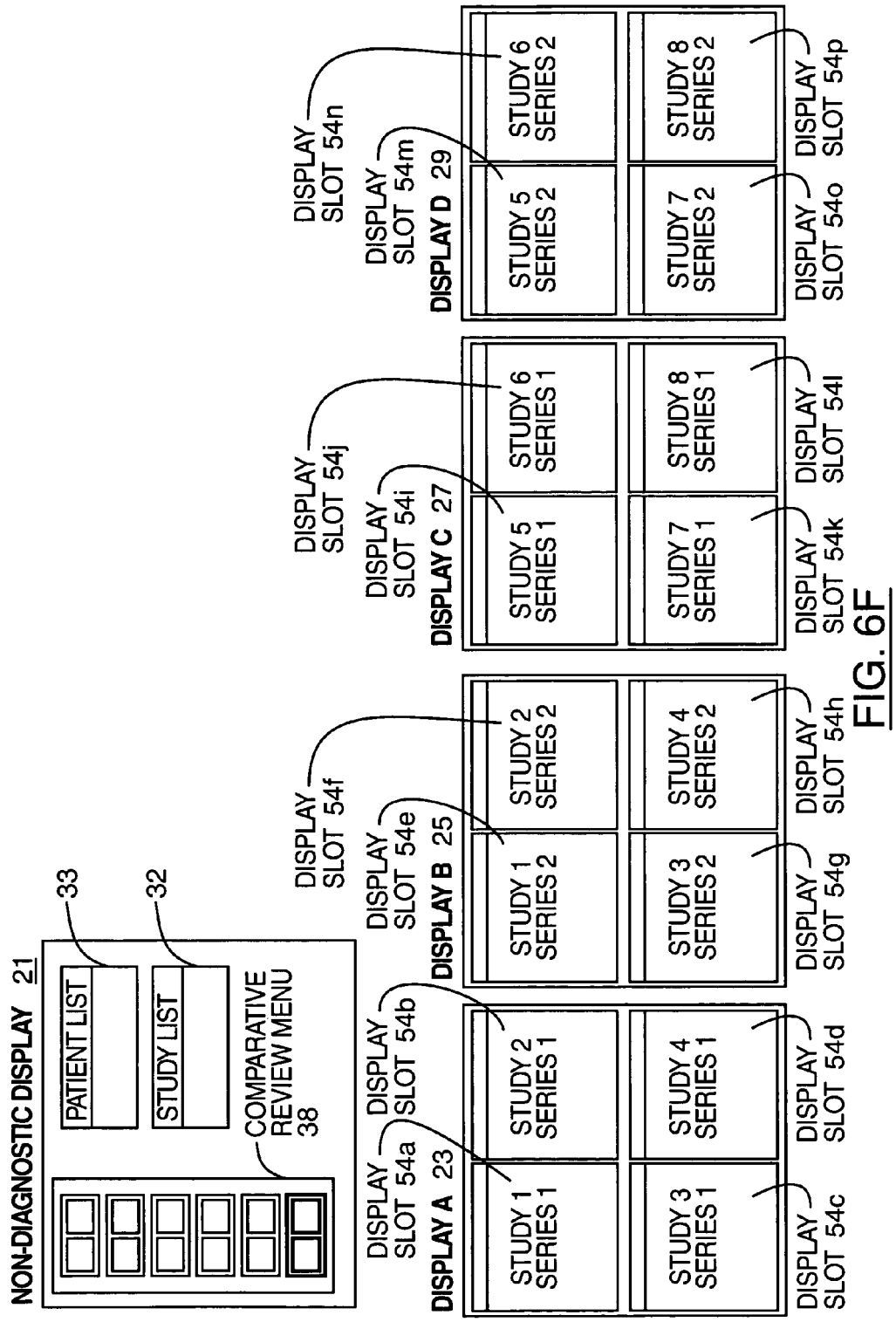

FIG. 6F illustrates a study layout 36 of 2×2, a series layout 46 of 1×1, and an image layout 56 of 1×1 and a study view mode of SPAN TWO SCREENS and a series view mode of A|B for four diagnostic displays A 23, B 25, C 27, D 29. That is, there are four studies 30 (i.e. two rows and two columns of studies 30) shown on each diagnostic display A 23, B 25, C 27, D 29. Also, there is only one series 40 (i.e. one row and one column of series 40) per diagnostic display A 23, B 25, C 27, D 29. Finally, there is only one image 50 (i.e. one row and one column of series 50) per series 40 on diagnostic displays A 23, B 25, C 27, D 29.

Since the study mode is SPAN TWO SCREENS, the same four studies 30 (namely study 1, study 2, study 3 and study 4) are displayed on diagnostic displays A 23, B 25 and the same four studies (namely study 5, study 6, study 7 and study 8) are displayed on diagnostic displays C 27 and D 29. Also, since the series view mode is A|B, different series 40 for each study 30 are displayed in the display slots 54 of the screen layout, over the available diagnostic displays. Accordingly, different images 50 are provided on diagnostic displays A 23, and B 25.

Accordingly, display slot 54a is treated as the same display slot as display slot 54e and is used to display series 1 and series 2 of study 1. Also, display slot 54b is treated as the same display slot as display slot 54f and is used to display image 1 and image 2 of series 1 of study 2. Display slot 54c is treated as the same display slot as display slot 54g and is used to display image 1 and image 2 of series 1 of study 3. Finally, display slot 54d is treated as the same display slot as display slot 54h and is used to display image 1 and image 2 of series 1 of study 4. Similarly, display slot 54i is treated as the same display slot as display slot 54m and is used to display series 1 and series 2 of study 5. Also, display slot 54j is treated as the same display slot as display slot 54n and is used to display image 1 and image 2 of series 1 of study 6. Display slot 54k is treated as the same display slot as display slot 54o and is used to display image 1 and image 2 of series 1 of study 7. Finally, display slot 54l is treated as the same display slot as display slot 54p and is used to display image 1 and image 2 of series 1 of study 8.

The multi-screen study view mode SPAN ALL SCREENS can also be used with a multi-screen layout. When this occurs, each display slot 54 of the screen layout will span the available diagnostic displays A 23, B 25, C 27, D 29. That is, the first display slot 54 on each diagnostic display A 23, B 25, C 27, D 29. will be treated as the same display slot 54 and display the series 40 and images 50 belonging to the same study 30. Similarly, the second display slots 54 on each diagnostic display A 23, B 25, C 27, D 29 will be used together to display the images 50 of a second study 30. These spanning display slots 54 are to be treated as a single display slot 54 for all arrangement purposes including series view mode, pinning and active study highlighting. For pinning, when a study 30 is pinned in a display slot 54 on display A 23, the study 30 will also be pinned in the corresponding display slots 54 on all other diagnostic displays B 25, C 27, D 29. Also, the display slots 54 on all diagnostic displays A 23, B 25, C 27, D 29 are highlighted for an active study 30.

The following examples in FIGS. 7A, 7B, 7C, 7D and 7E illustrate the spanning nature of the multi-study layouts of comparative image review system 10 when used with the SPAN ALL SCREENS study view mode.

FIG. 7A illustrates a study layout 36 of 2×1 a series layout 46 of 1×1, and an image layout 56 of 1×1 and a study view mode of SPAN ALL SCREENS and a series view mode of A|B for four diagnostic displays A 23, B 25, C 27, D 29. That is, two studies 30 (i.e. two rows and one column of studies 30) are displayed on each diagnostic display A 23, B 25, C 27, D 29 as shown. Also, there is only one series 40 (i.e. one row and one column of series 40) per display A 23, B 25, C 27, D 29 as shown. Finally, there is only one image 50 (i.e. one row and one column of images 50) per diagnostic display A 23, B 25, C 27, D 29.

Since the study mode is SPAN ALL SCREENS, display slots 54*a*, 54*c*, 54*e*, and 54*g* are all considered to be the same display slot 54, and so the same study 30 (namely study 1) is displayed in these display slots 54 of the screen layout on diagnostic displays A 23, B 25, C 27, D 29. Similarly, 54*b*, 54*d*, 54*f*, and 54*h* are all considered to be the same display slot 54, and so the same study 30 (namely study 2) is displayed in these display slots 54 of the screen layout on diagnostic displays A 23, B 25, C 27, D 29. Also, since the series view mode is A|B, different series 40 are displayed in the display slots 54 of the screen layout, on diagnostic displays A 23, B 25, C 27, D 29. That is, series 1, series 2, series 3 and series 4 of study 1 are displayed in display slots 54*a*, 54*c*, 54*e*, and 54*g*, respectively. Also, series 1, series 2, series 3 and series 4 of study 2 are displayed in display slots 54*b*, 54*d*, 54*f*, and 54*h*, respectively.

Figure 7B:
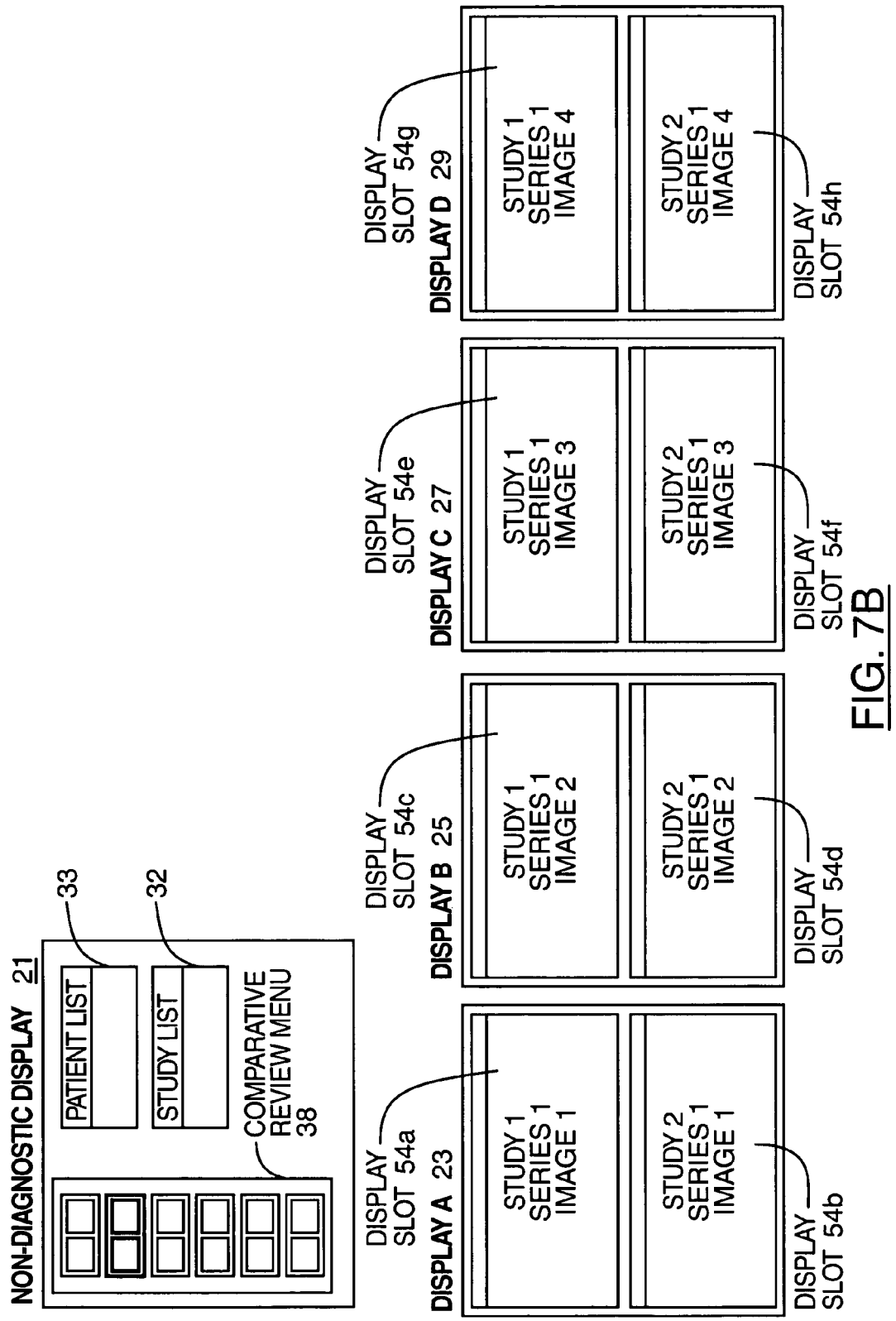

FIG. 7B illustrates a study layout 36 of 2×1 a series layout 46 of 1×1, and an image layout 56 of 1×1 and a study view mode of SPAN ALL SCREENS and a series view mode of A|A for four diagnostic displays A 23, B 25, C 27, D 29. That is, there are two studies 30 (i.e. two rows and one column of studies 30) shown on each diagnostic display A 23, B 25, C 27, D 29 as shown. Also, there is only one series 40 (i.e. one row and one column of series 40) per display A 23, B 25, C 27, D 29 as shown. Finally, there is only one image 50 (i.e. one row and one column of images 50) per display A 23, B 25, C 27, D 29 as shown.

Since the study mode is SPAN ALL SCREENS, display slots 54*a*, 54*c*, 54*e*, and 54*g* are all considered to be the same display slot 54, and so the same study 30 (namely study 1) is displayed in these display slots 54 of the screen layout on diagnostic displays A 23, B 25, C 27, D 29. Similarly, 54*b*, 54*d*, 54*f*, and 54*h* are all considered to be the same display slot 54, and so the same study 30 (namely study 2) is displayed in these display slots 54 of the screen layout on diagnostic displays A 23, B 25, C 27, D 29. Also, since the series view mode is A|A, for each study 30, the same series 40 is displayed in the display slots 54 of the screen layout, on diagnostic displays A 23, B 25, C 27, D 29. Comparative review system 10 displays different images in these display slots 54. Specifically, images 1, image 2, image 3 and image 4 of series 1 of study 1 are displayed in display slots 54*a*, 54*c*, 54*e*, and 54*g*, respectively. Also, image 1, image 2, image 3 and image 4 of series 1 of study 2 are displayed in display slots 54*b*, 54*d*, 54*f*, and 54*h*, respectively.

Figure 7C:
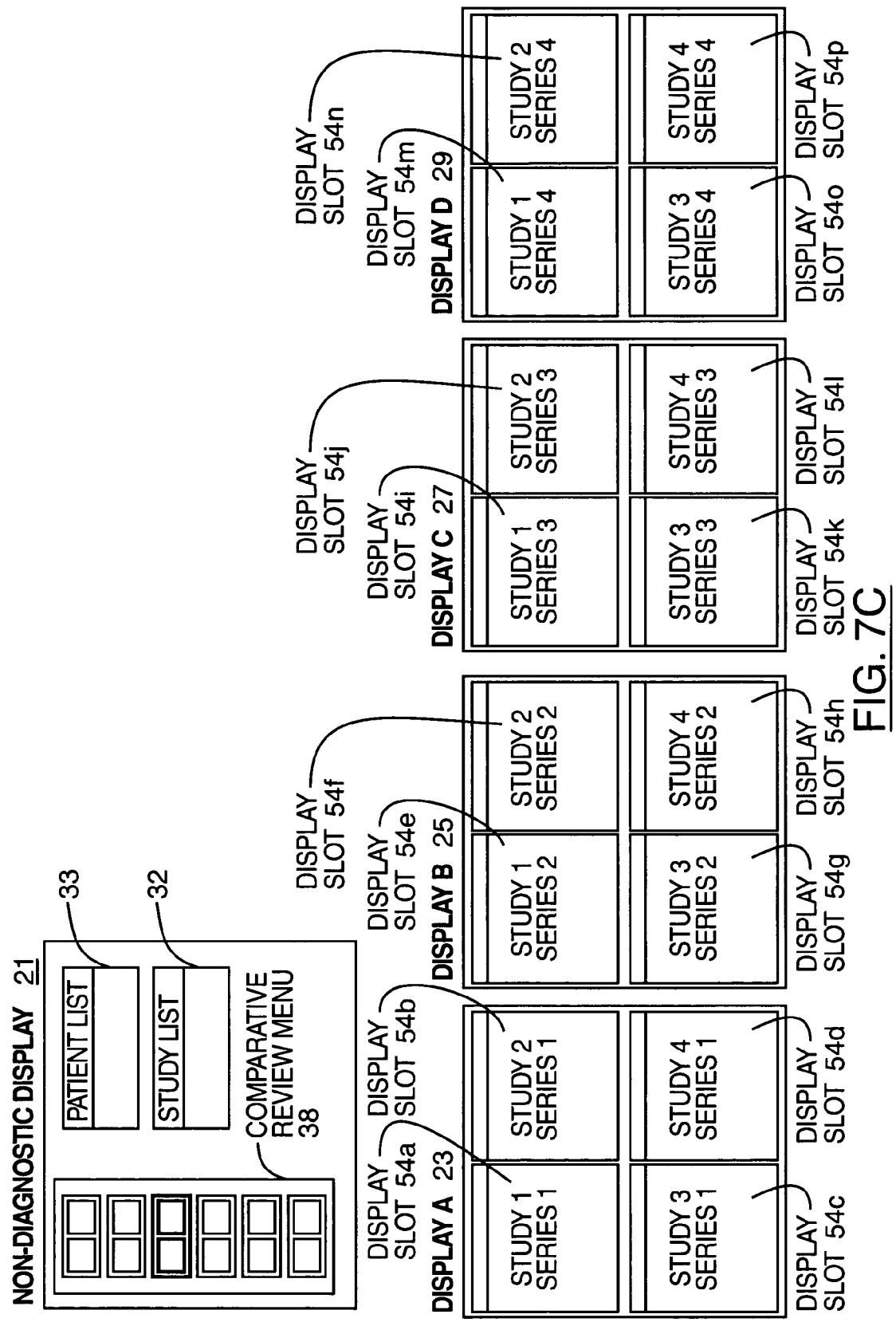

FIG. 7C illustrates a study layout 36 of 2×2 a series layout 46 of 1×1, and an image layout 56 of 1×1 and a study view mode of SPAN ALL SCREENS and a series view mode of A|B for four diagnostic displays A 23, B 25, C 27, D 29. That is, there are four studies 30 (i.e. two rows and one column of studies 30) shown on each diagnostic display A 23, B 25, C 27, D 29 as shown. Also, there is only one series 40 (i.e. one row and one column of series 40) per display A 23, B 25, C 27, D 29 as shown. Finally, there is only one image 50 (i.e. one row and one column of images 50) per diagnostic display A 23, B 25, C 27, D 29 as shown.

Since the study mode is SPAN ALL SCREENS, display slots 54*a*, 54*e*, 54*i*, and 54*m* are all considered to be the same display slot 54 and accordingly, the same study 30 (namely study 1) is displayed in these display slots of the screen layout on diagnostic displays A 23, B 25, C 27, D 29. Similarly, display slots 54*ab* 54*f*, 54*j*, and 54*n* are all considered to be the same display slot 54, and so the same study 30 (namely study 2) is displayed in these display slots 54. Also, 54*c*, 54*g*, 54*k*, and 54*o* are all considered to be the same display slot 54, and so the same study 30 (namely study 3) is displayed in these display slots 54. Finally, since, 54*d*, 54*h*, 54*l*, and 54*p* are all considered to be the same display slot 54, and so the same study 30 (namely study 4) is displayed in these display slots 54. Also, since the series view mode is A|B, different series 40 are displayed in the display slots 54 of the screen layout, on diagnostic displays A 23, B 25, C 27, D 29. That is, series 1, series 2, series 3 and series 4 of study 1 are displayed in display slots 54*a*, 54*e*, 54*i*, and 54*m*, respectively and so on as shown.

Figure 7D:
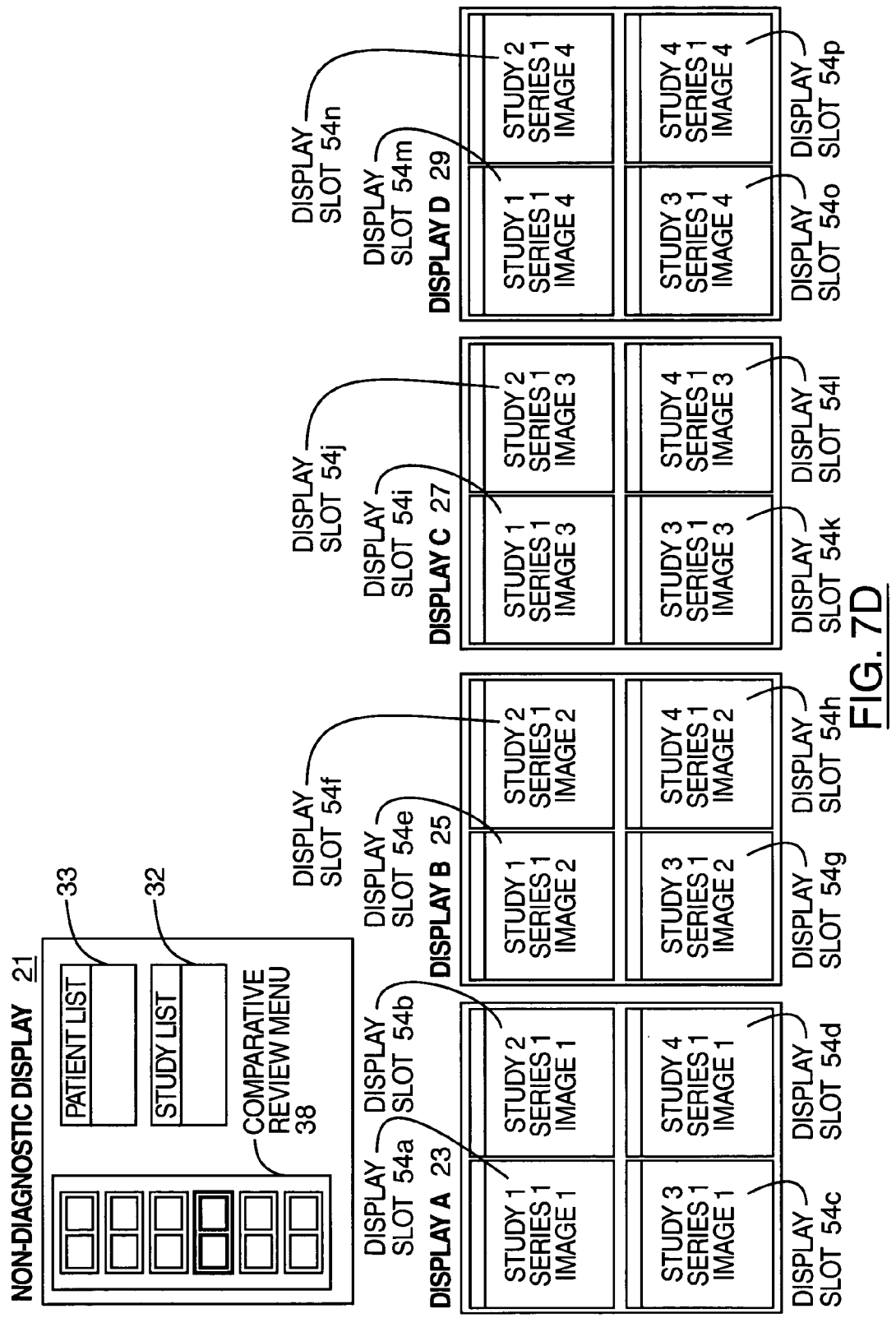

FIG. 7D illustrates a study layout 36 of 2×2 a series layout 46 of 1×1, and an image layout 56 of 1×1 and a study view mode of SPAN ALL SCREENS and a series view mode of A|A for four diagnostic displays A 23, B 25, C 27, D 29. That is, there are four studies 30 (i.e. two rows and one column of studies 30) shown on each diagnostic display A 23, B 25, C 27, D 29 as shown. Also, there is only one series 40 (i.e. one row and one column of series 40) per diagnostic display A 23, B 25, C 27, D 29 as shown. Finally, there is only one image 50 (i.e. one row and one column of images 50) per diagnostic display A 23, B 25, C 27, D 29 as shown.

Since the study mode is SPAN ALL SCREENS, display slots 54*a*, 54*e*, 54*i*, and 54*m* are all considered to be the same display slot 54 and accordingly, the same study 30 (namely study 1) is displayed in these display slots of the screen layout on diagnostic displays A 23, B 25, C 27, D 29. Similarly, display slots 54*ab* 54*f*, 54*j*, and 54*n* are all considered to be the same display slot 54, and so the same study 30 (namely study 2) is displayed in these display slots 54. Also, 54*c*, 54*g*, 54*k*, and 54*o* are all considered to be the same display slot 54, and so the same study 30 (namely study 3) is displayed in these display slots 54. Finally, since, 54*d*, 54*h*, 54*l*, and 54*p* are all considered to be the same display slot 54, and so the same study 30 (namely study 4) is displayed in these display slots 54. Also, since the series view mode is A|A, the same series 40 are displayed in the display slots 54 of the screen layout, on diagnostic displays A 23, B 25, C 27, D 29. Comparative review system 10 displays different images in these display slots 54. That is, image 1, image 2, image 3 and image 4 of study 1 are displayed in display slots 54*a*, 54*e*, 54*i*, and 54*m*, respectively and so on as shown.

User 11 can change the study view mode between SPAN ONE SCREEN, SPAN TWO SCREENS and SPAN ALL SCREENS study view modes using Study View Mode button 41*e* (FIG. 5). If there are less than four monitors, the SPAN ALL SCREENS mode will not be available. If there are less than two monitors, the SPAN TWO SCREENS mode will not be available.

At step (116), hanging protocol module 18 identifies the hanging protocol associated with the active comparative review mode and applies the active hanging protocol to the selected study(ies) 30. As discussed above, a hanging protocol is a mapping that defines a particular order of series 40 according to certain series attributes (e.g. radiographic view, etc.) In this way, the display slots 54 of a screen layout that have been established by screen layout module 14 are populated by various series 40 of study 30 in accordance with the hanging protocol associated with the active comparative review mode.

For the purposes of the present disclosure, it will be assumed each distinct series 40 of the selected study(ies) 30 is associated with a single radiographic view. However, it should be understood that the hanging protocols utilized by hanging protocol module 18 could order series 40 according to other series attributes and that different radiographic views could be present within a series 40. It is contemplated that within the context of ordering series 40 by radiographic view, if a series 40 is provided from another proprietary system that contains various radiographic views, then such a series 40 could be partitioned or split up into sub-series each of which would only be associated with a single radiographic view.

When determining where the "first", "second", "third" etc. series 40 (as defined by a hanging protocol) are to be placed within the display areas A23, B25, various ordering conventions can also be adopted within display slots 54. For example, a 2×2 set of display slots 54 within a display can be filled according to the ordering convention: top left display slot 54 first, top right display slot 54 second, bottom left display slot 54 third and bottom right display slot 54 fourth. Accordingly, the first, second, third, fourth etc. series 40 as ordered by the hanging protocol would be placed in order within corresponding first, second, third and fourth display slots 54 described above. The specific type of ordering convention depends on the particular screen layout and study view mode and series view mode associated with a comparative review mode as will be illustrated.

Figure 8A:
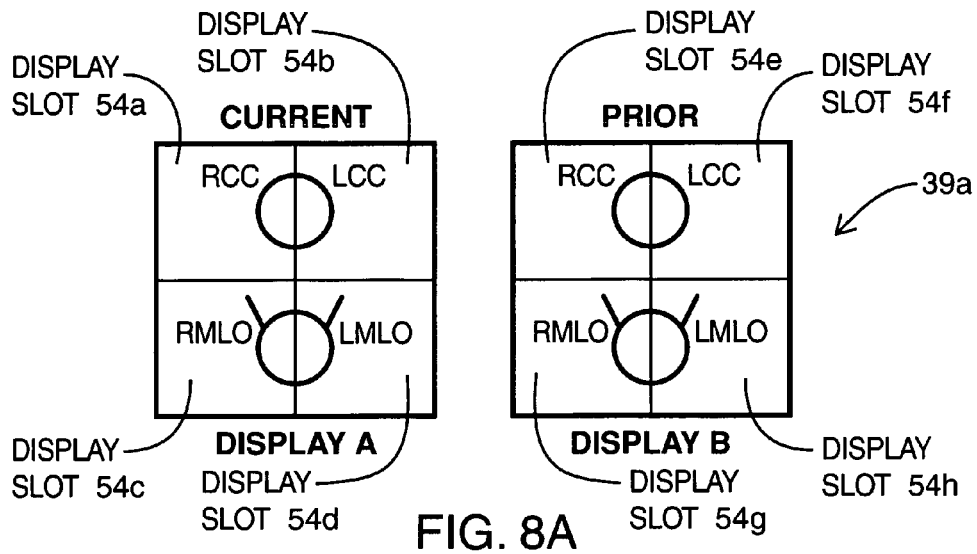
FIGS. 8A to 8C are schematic diagrams illustrating example comparative review mode icons, each with a different associated hanging protocol as utilized by the comparative review system of FIG. 2.
Figure 8B:
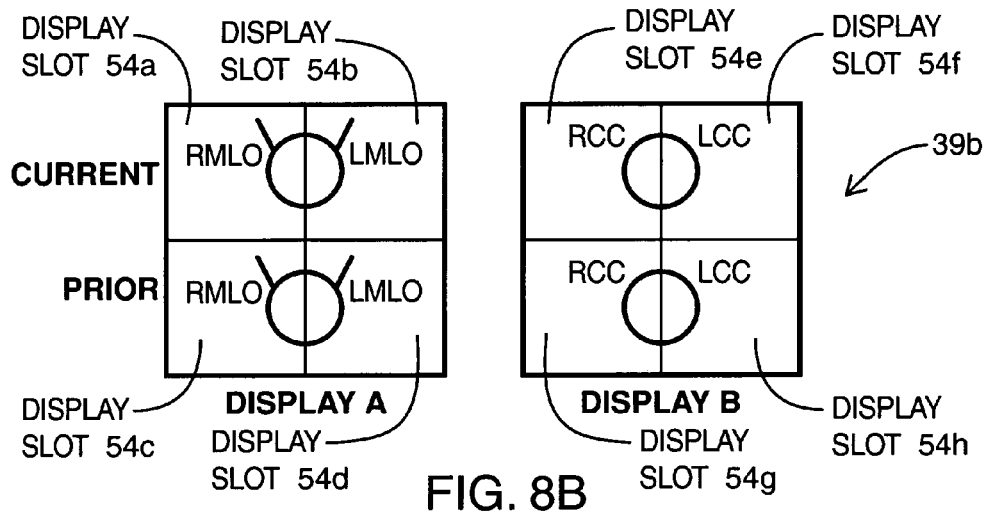
Figure 8C:
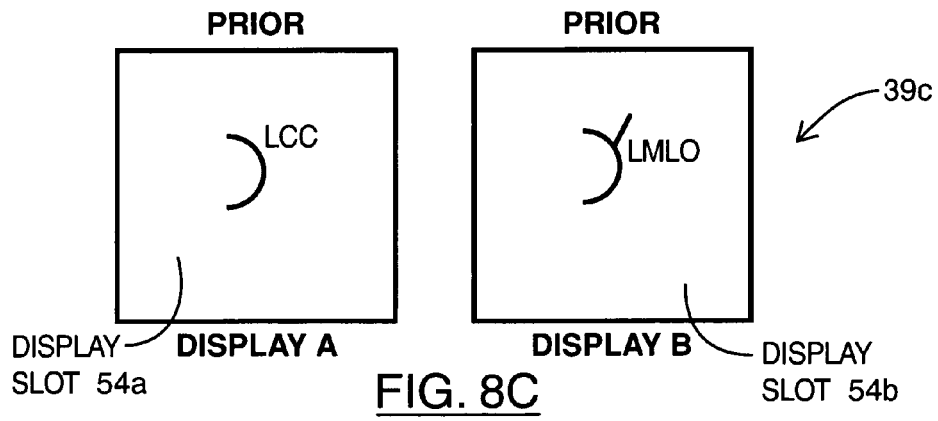

FIGS. 8A to 8C illustrate three example comparative review mode icons 39a, 39b, and 39c, each with a different associated hanging protocol. Specifically, FIGS. 8A to 8C illustrate example comparative review modes icons 39 that provide various radiographic views in a particular order within display slots 54a, 54b, 54c, 54d, 54e, 54f, 54g and 54h for mammography studies 30. As discussed above, a hanging protocol defines an ordering for various series 40 of selected study(ies) 30. Various combinations of four conventionally known radiographic views will be utilized in these examples, namely: Right Cranial Caudal (RCC), Left Cranial Caudal (LCC), Right Medial Lateral Oblique (RMLO), Left Medial Lateral Oblique (LMLO).

FIG. 8A shows an example comparative review mode icon 39a that utilizes the Standard Image Compare CC/MLO hanging protocol. Specifically, this hanging protocol defines the ordering of series 40 according to the radiographic view ordering: RCC, RMLO, LCC and LMLO. In order to determine the ordering convention for the screen layout, the screen layout and study/series view modes need to be considered. The screen layout 36 is 1×1, the series layout 46 is 2×2 and the image layout 56 is 1×1. The study view mode is SPAN ONE SCREEN and the series view mode is A|B. This means that there will be one study 30 (one row and one column of study 30), four series 40 (two rows and two columns of series 40) and one image 50 (one row and one column of image 50) for each study 30 per display A 23, B 25 as shown. Accordingly, RCC, RMLO, LCC and LMLO radiographic views of a current study 30 are displayed on display A 23 in display slots 54a, 54b, 54c, 54d, respectively. Also, RCC, RMLO, LCC and LMLO radiographic views of a prior study 30 are displayed on display B 25 in display slots 54e, 54f, 54g and 54h.

FIG. 8B shows an example comparative review mode icon 39b that utilizes the Standard Image Compare CC/MLO hanging protocol. Specifically, this hanging protocol defines the ordering of series 40 according to the radiographic view ordering: RMLO, LMLO, RCC, LCC. In order to determine the ordering convention for the screen layout, the screen layout and study/series view modes need to be considered. The screen layout for this hanging protocol pictured comprises a study layout 36 of 2×1, a series layout 46 of 1×2 and an image layout 56 of 1×1 and the study view mode is SPAN ALL SCREENS. This means that there will be two studies 30 (two rows and one column of study 30), two series 40 (one row and two columns of series 40) for each study 30 and one image 50 (one row and one column of image 50) for each study 30 per display A 23, B 25 as shown. Accordingly, RMLO, LMLO, RCC, LCC radiographic views of a current study 30 are displayed on display A 23 in display slots 54a, 54b, 54e, 54f, respectively. Also, RMLO, LMLO, RCC, LCC radiographic views of a prior study 30 are displayed on display B 25 in display slots 54c, 54d, 54g and 54h, respectively.

FIG. 8C shows an example comparative review mode icon 39c that utilizes the Standard Image Compare CC/MLO hanging protocol. Specifically, this hanging protocol defines the ordering of series 40 according to the radiographic view ordering: LCC/MLO (Prior). In order to determine the ordering convention for the screen layout, the screen layout and study/series view modes need to be considered. The screen layout for the hanging protocol pictured comprises a study layout 36 of 1×1, a series layout 46 of 1×1 and an image layout 56 of 1×1 and the study view mode is SPAN TWO SCREENS. This means that there will be one study 30 (one row and one column of study 30), one series 40 (one rows and one columns of series 40) and one image 50 (one row and one column of image 50) per display A 23, B 25 as shown. Accordingly, an LCC view of a prior study is displayed on display A 23 in display slot 54a and a LMLO view of a prior study is displayed on display B 25 in display slot 54b.

In the above examples, all of the required series 40 (i.e. the radiographic views) were assumed to be available within the selected study(ies) 30. If a required series 40 (i.e. required radiographic view) for a particular hanging protocol is not available, then comparative review module 12 will preferably still provide the selected comparative review mode. This is accomplished by displaying all the other available series 40 (i.e. required radiographic views) within their associated display slots 54 while displaying a blank image for the unavailable series 40 within the associated display slot 54. This approach provides user 11 with a consistent representation of series 40 in keeping with the principles of a hanging protocol.

At step (118) pinning module 26 allows a user 11 to "pin" a particular study 30. Alternatively, certain comparative review modes can be defined as requiring a current study to be automatically "pinned". Pinning module 26 then ensures that a study 30 that has been pinned in a display slot 54 of a screen layout will remain in that display slot 54 during any subsequent study navigation. Only by unpinning the study 30 from that display slot 54 can another study 30 be displayed in that slot (by any means of study navigation). A pinned marker (e.g. a "*" beside the study box 34) is used to provide visual indication that the current study 30 is pinned. Pinning module 26 also allows user 11 to "unpin" studies 30 as desired.

Once user 11 selects a particular study 30 for pinning, pinning module 26 sends formatting commands to study/series view module 16 and study display module 20 to pin the study 30 within all affected screens and provide the pinned marker (e.g. "*") as appropriate. The studies 30 on the affected screens are redisplayed and the currently selected study 30 is updated and highlighted as appropriate. When the user 11 selects a pinned study 30 for "unpinning", pinning module 26 sends reformatting commands to study/series view module 16 and study display module 20 to unpin the study 30 within all affected screens and remove the associated pinned marker. Again, the studies 30 on the affected screens are redisplayed and the currently selected study 30 is updated and highlighted as appropriate.

In a preferred example implementation of comparative image review system 10, at step (118), the current study 30 is automatically "pinned" for a number of selected comparative review modes. Typically, the comparative review modes are selected to provide "pinning" of the current study 30 when the comparative review mode requires a multi-study screen layout (i.e. current and prior study(ies) 30 to be displayed) and a spanning study view mode (i.e. SPAN TWO SCREENS or SPAN ALL SCREENS study view modes). Pinning of the current study 30 is not applicable for comparative review modes that require a single study screen layout (i.e. only one study 30 is displayed) and single spanning study view mode (i.e. SPAN ONE SCREEN study view mode) since navigation to prior studies 30 would not be possible.

At step (119), comparative review module 12 instructs study display module 20 to display the appropriately formatted study(ies) 30 on diagnostic displays A and B 23, 25.

At step (120), comparative review module 12 determines whether user 11 has selected any of the comparative review navigation tools, namely, COMPARATIVE REVIEW (or any of the mode icons 39), PREVIOUS CRM, or NEXT CRM, buttons 41a, 41b, 41c, respectively. If so, then at step (121), comparative review mode (CRM) navigation module 31 initiates comparative review mode navigation. It should be understood that while comparative review navigation is illustrated in the present disclosure through the use of specific graphical user interface button tools, user 11 may instigate comparative review navigation within comparative review mode 10 using many other different interactive elements (e.g. through the use of pull down menus, or short cut keys etc.).

Once comparative review mode navigation is initiated, CRM navigation module 31 displays the selected comparative review mode for display. Comparative review system 10 allows user 11 to obtain display of comparative review modes out of sequence. User 11 may simply select a desired comparative review mode from comparative review sequence menu 38 and comparative review will activate that comparative review mode. Specifically, user 11 can navigate to a desired comparative review mode (i.e. one that is not currently being displayed) by selecting the corresponding mode icon 39 from within comparative review sequence menu 38.

At any time during comparative review, user 11 may select COMPARATIVE REVIEW tool 41a and comparative review module 12 will display the comparative review sequence menu 38 in order to illustrate the various comparative review modes within the sequence. Also, the active comparative review mode will be indicated within the sequence using some indicia (e.g. shaded or otherwise highlighting the comparative review mode to provide user 11 with a visual indication of their position within the comparative review sequence.

The NEXT CRM button 41c allows user 11 to navigate to the NEXT CRM. The PREVIOUS CRM button 41b allows user 11 to navigate to the previous comparative review mode in order to examine and compare the view of the current study 30 with any prior studies 30.

Once user 11 has either selected another mode icon 39 or the NEXT or PREVIOUS CRM buttons 41b and 41c, screen layout module 14 changes the screen layout on diagnostic displays A and B 23, 25 to the screen layout defined for the comparative review mode. Then CRM navigation module 31 obtains the required study(ies) 30 (e.g. current or prior studies as required by the comparative review mode) from study display module 20 and instructs comparative review module 12 to apply screen layout, study/series mode and hanging protocol defined for the newly selected comparative review mode to the selected study(ies) 30 as shown in steps (112) to (116). The current study 30 is pinned as described above at step (118) as required and then at step (119) the study(ies) 30 are displayed. User 11 is then able to perform the comparative examination of the studies 30 on diagnostic displays A and B 23, 25.

If the last applied comparative review mode using the NEXT CRM button 41c was the last in the comparative review sequence then use of the NEXT CRM button 41c will apply the first comparative review mode in the sequence (i.e. "wrap around" application). Correspondingly, if the last applied comparative review mode using the PREVIOUS CRM tool button 41c was the first in the comparative review sequence then use of the PREVIOUS CRM tool button 41c will apply the last comparative review mode in the sequence (i.e. "wrap around" application).

At step (122), comparative review module 12 determines whether the user 11 would like to review studies outside of the strict definitions of comparative review modes. Specifically, user 11 may select SCREEN LAYOUT, STUDY VIEW MODE, SERIES VIEW MODE or HANGING PROTOCOL buttons 41j, 41e, 41h or 41k, respectively or requests review for different patients, study(ies) 30, series 40 or images 50 then those displayed by selecting PATIENT NAVIGATION button 41g, STUDY NAVIGATION button 41d, SERIES NAVIGATION button 41f and IMAGE NAVIGATION tools 41i. Due to the strict rules of display discussed associated with comparative review modes, comparative review system 10 provides user 11 with the opportunity to review study(ies) 30, series 40 and images 50 outside the comparative review modes.

Specifically, if the user 11 has selected the SCREEN LAYOUT, STUDY VIEW MODE, SERIES VIEW MODE or HANGING PROTOCOL buttons 41j, 41 e, 41h or 41k, respectively or the PATIENT NAVIGATION, STUDY NAVIGATION, SERIES NAVIGATION, or IMAGE NAVIGATION buttons 41g, 41d, 41h, or 41i (FIG. 5), then at step (123), study navigation module 28 initiates study navigation. It should be understood that while the initiation of patient, study, series and image navigation is illustrated in the present disclosure through the use of specific graphical user interface button tools, user 11 may instigate study, series or image navigation within comparative review mode 10 using many other different interactive elements (e.g. through the use of pull down menus, or short cut keys etc.).

The SCREEN LAYOUT button 41j allows the user 11 to change the screen layout for the study(ies) 30 being displayed. That is, user 11 can choose to override the screen layout defined by the active (i.e. currently displayed) comparative review mode. As discussed above, screen layout consists of a study layout 36 of A×B where A and B represent the number of rows and columns that the selected study(ies) 30 are to be displayed in, a series layout of C×D where C and D represent the number of rows and columns that the series 40 of the selected studies 30 are to be displayed in, and an image layout of E×F where E and F represent the number of rows and columns that the image(s) 50 of the series 40 of the selected studies 30 are to be displayed in. User 11 may wish to override the screen layout associated with an active comparative review mode in favour of another screen layout for various reasons. For example, if a user 11 wishes to view series 40 in a larger format, the user 11 could select a screen layout which features fewer series 40 (e.g. 1×1 instead of 2×2) within diagnostic displays A23, B25, etc.

The STUDY VIEW MODE and SERIES VIEW MODE buttons 41e, 41h allow the user 11 to change the study and series view modes for the study(ies) 30 being displayed, respectively. That is, user 11 can choose to override the study and series view modes defined by the active (i.e. currently displayed) comparative review mode.

User 11 can use the STUDY VIEW MODE button 41e to change the study view mode (as discussed above) between SPAN ONE SCREEN, SPAN TWO SCREENS, and SPAN ALL SCREENS study view modes. If there are less than four monitors, the SPAN ALL SCREENS mode will not be available. If there are less than two monitors, the SPAN TWO SCREENS mode will not be available. If the applied study view mode is SPAN TWO SCREENS then a pair of displays A 23, B 25 that the screen layout spans is considered to be the same display for the purposes of study navigation. Similarly if the applied study view mode is SPAN ALL SCREENS then the entire set of all displays A 23, B 25, C 27, D 29 is considered to be the same monitor for purposes of study navigation.

Also, user 11 can use the SERIES VIEW MODE button 41*h* to change the series view mode (as discussed above) between A|A and A|B series view modes for the study(ies) 30 being viewed. As discussed above, the A|A series view mode provides for only one series 40 to be displayed across display slots 54 of a screen layout, over the available screens (as limited by the study view mode). The A|B series view mode provides for different series 40 to be displayed in the display slots 54 of a screen layout, over the available screens (as limited by the study view mode). It should be understood that at any time, if user 11 selects a mode icon 39 or any one of PREVIOUS CRM or NEXT CRM buttons 41*b*, 41*c*, comparative review navigation module 31 will cause the selected comparative review mode to be activated and steps (112) to (118) will be applied to the selected study(ies) 30.

The HANGING PROTOCOL button 41*k* allows the user 11 to change the hanging protocol for the study(ies) 30 being displayed. That is, user 11 can choose to override the hanging protocol defined by the active (i.e. currently displayed) comparative review mode. As discussed above, hanging protocol module 18 applies a defined hanging protocol and automatically arranges various series 40 of a study 30 within display slots 54 previously defined by a screen layout according to the ordering defined by the hanging protocol. User 11 may wish to override the hanging protocol associated with an active comparative review mode in favour of another hanging protocol for various reasons. For example, if a user 11 wishes to view series 40 in a different sequence within display slots 54 of screen layout.

User 11 can also navigate to the study(ies) 30 associated with another patient within an active comparative review mode by selecting PATIENT NAVIGATION button 41*g*. When user 11 selects PATIENT NAVIGATION button 41*g*, study display module 20 highlights the patient list 33 on non-diagnostic display 21 and allows user 11 to select study(ies) 30 for display for another patient. Typically, the user is provided with a scrollbar to review a number of patients and to select desired patient and associated study(ies) 30 for display. Once this is done, study navigation module 28 obtains the newly selected study(ies) 30 from study display module 20 and replaces the study(ies) 30 currently displayed in the active comparative review mode with the newly selected study(ies) 30.

User 11 can navigate to another study(ies) 30 within an active comparative review mode by selecting a STUDY NAVIGATION button 41*d*. When the STUDY NAVIGATION button 41*d* is selected, study display module 20 highlights the study list 32 on non-diagnostic display 21 and allows user 11 to select another study(ies) 30 for display for the patient being examined. Typically, the user is provided with a scrollbar to review a number of study(ies) 30 and to select desired study(ies) 30 for display. Once this is done, study navigation module 28 obtains the newly selected study(ies) 30 from study display module 20 and replaces the study(ies) 30 currently displayed in the active comparative review mode with the newly selected study(ies) 30.

Certain rules for replacement of study(ies) 30 can be implemented by study navigation module 28. For example, in a case where it is desired to leave the current study 30 on display but to replace the prior study 30 being displayed, user 11 can manipulate, import and display a series 40 associated with a prior study 30 that replaces a prior study 30 on display. Study navigation module 28 will receive input from user 11 (i.e. though additional keystroke or other commands that signify a request to display "next prior study" for example). In this case, the current study 30 is left pinned and the series 40 for the next prior study(ies) 30 are displayed according to the active comparative review mode.

User 11 can navigate to another series 40 within an active comparative review mode by selecting a SERIES NAVIGATION button 41*h*. When the SERIES NAVIGATION button 41*h* is selected, study display module 20 provides a series scrollbar (not shown) which contains thumbnail images of the various series 40 for the currently selected study(ies) 30. The series scrollbar allows the user 11 to scroll through the various series 40 available and to select desired series 40 for display. If the user 11 "drags and drops" a desired series 40 from the series scrollbar to one of the display slots 54 within the comparative review mode's screen layout then study navigation module 28 obtains the newly selected series 40 from study display module 20 and replaces the series 40 currently displayed in the active comparative review mode with the newly selected series 40.

User 11 can navigate to other images 50 within an active comparative review mode by selecting an IMAGE NAVIGATION button 41*i* and by using various types of predetermined inputs, preferably by manipulating the mouse wheel 9 within user workstation 19. When this occurs, study navigation module 28 obtains the newly selected images 50 from study display module 20 and replaces the images 50 currently displayed in the active comparative review mode with the newly selected images 50.

Navigation to a study 30, series 40 or image 50 will result in the selected study 30, series 40 or image 50 being preferably displayed in the left, topmost display slot 54 of the current screen layout. If there is a pinned study 30 already positioned in the left, topmost display slot 54 in the current screen layout, then the selected study 30 will be positioned in the closest display slot 54 available. Study navigation module 28 positions the selected study 30 in the left, topmost display slot 54 even if the study 30 is already displayed in another display slot 54 or if there are more display slots 54 than remaining studies 30 after the selected study 30. It should be understood that with the exception of pinned studies 30, study navigation module 28 will preferably cause studies 30 to be scrolled to the left, topmost display slot 54, possibly leaving empty display slots 54 if there are more display slots 54 in the screen layout than there are studies 30 remaining after the selected study 30.

At step (126), it is periodically determined whether any user-selected events have occurred which will cause CRM module 31 to re-activate the active comparative review mode and to reset any manual study navigation selections with the display defaults associated with the active comparative review mode.

Automatic reactivation of the active comparative review mode can occur when user 11 selects a comparative review mode icon 39 or any one of the COMPARATIVE REVIEW button 41*a*, PREVIOUS CRM 41*b*, or NEXT CRM buttons 41*c*. As soon as the user selects PREVIOUS or NEXT CRM buttons 41*b* or 41*c*, user 11 is put back into the comparative review sequence. Upon reactivation, preferably comparative review module 12 ensures that the active comparative review mode is the one that was active when the user 11 was previously within comparative review mode navigation.

Automatic reactivation of the active comparative review mode also occurs when user 11 conducts study navigation to study(ies) 30 that were not initially selected for display. When this occurs, comparative review module 12 will cause the active comparative review mode to be applied to the selected study(ies) 30. Upon reactivation, preferably comparative review module 12 ensures that the active comparative review mode is the one that was active when the user 11 was previously within comparative review mode navigation.

Automatic reactivation of the active comparative review mode also occurs when user 11 conducts study navigation to study(ies) 30 associated with another patient. When this occurs, comparative review module 12 will determine whether the comparative review sequence is applicable and if so then will cause the first applicable comparative review mode to be automatically re-applied to the selected study(ies) 30.

Finally, when the user 11 wishes to dictate the current study 30, comparative review module 12 allows for this to occur and then updates the status of the study 30 to be dictated (i.e. to "dictated"). After dictation of the current study 30 is completed, the study 30 will become the first prior study 30 in the study list 32 for that patient since it will be the newest prior study in study list 32 for that patient. When dictation is completed for a study 30, comparative review module 12 obtains the next unread study 30 to be reviewed for the patient and automatic re-activates the comparative review sequence. In this case, the first applicable comparative review mode is applied to the next unread study 30 to be reviewed.

At step (125), it is determined whether the user 11 has completed their review of study(ies) 30 for patient. If there are no other unread studies 30 in the study list 32 for the current patient then navigation to the next patient in the study list 32 is performed and at step (106), user 11 selects another patient for comparative review. If there are other unread studies 30 in the study list 32 for the current patient, then at step (108), user 11 selects another study(ies) 30 for the patient and runs through steps (110) to (122) again.

Within one example implementation of comparative image review system 10, it is preferred for the hanging protocols implemented by hanging protocol module 18 to be considered "strict" hanging protocols. That is, if a view of a study 30 is required by a hanging protocol associated with a comparative review mode and cannot be found for a particular series slot then nothing will be displayed within that series slot (i.e. the slot will be empty). This approach preserves the sequence of images that is a useful feature of a comparative review system. Also, if a comparative review mode in the sequence is defined to display a study 30 that is not present in the study list 32 for the patient then the comparative review mode will be skipped and the next review mode will be considered. If no applicable comparative review mode in the sequence can be applied then no review mode will be applied. Also, if the modality of at least one study 30 in the study list 32 for the patient is something other than the selected modality, then comparative review module 12 does not activate any comparative review mode and instead applies a default screen layout for the modality of the at least one study 30.

It should be understood that if one or more studies 30 required for a particular comparative review mode are not available (i.e. not within the study list 32 for that patient) then it is preferred for a user 11 not to be able to apply that comparative review mode. Specifically, this means that comparative review module 12 will ignore the input of any keyboard shortcuts from user workstation 19 that call for application of the comparative review mode. Further, CRM navigation module 31 will skip that comparative review mode during any next or previous navigation actions that user 11 makes within the overall comparative review sequence. All other interface controls (e.g. buttons for the comparative review mode or menu entry keys for the comparative review mode within the comparative review sequence) to that comparative review mode will be disabled. For example, if a study list 32 for a patient only contains one current study 30 but no prior studies 30 then any comparative review mode that is designed to display a prior study 30 (e.g. one designed to display both current and prior studies 30) could not be navigated to or applied by user 11 (i.e. either using keyboard shortcuts, sequence navigation or direct selection).

Finally, if no comparative review mode has been added to the sequence by user 11 (i.e. the sequence is null), then no comparative review mode will be applied. In this way, a user 11 can effectively disable the default procedure of entering a comparative review mode when displaying a study list 32 containing studies 30 of the selected modality (e.g. MG) by customizing the comparative review mode sequence to contain no comparative review modes.

A preferred implementation of comparative image review system 10 is to encapsulate the concept and behavior of comparative review modes and their management in a comparative review mode class. The class would have the ability to set a screen layout, configure the study view mode and apply a hanging protocol. Each comparative review mode required would then be an instance of this class at run time. When user 11 selects a comparative review mode then the associated instance for the selected comparative review mode would be retrieved and activated causing application of the comparative review mode. The required screen layout, study view mode and hanging protocol for each comparative review mode can be implemented and defined either through hard coding, flat file definition or a new table in user preference database 24.

An important component of a comparative review mode is the associated hanging protocol. As previously discussed, a hanging protocol determines how the series 40 of a study 30 is to be arranged on diagnostic display A and B 23, 25. The hanging protocols defined for the comparative review modes require the view of a series 40 to be available at the time that the comparative review modes are applied. Accordingly, it is necessary to ensure that a hanging protocol that requires a complete and specific set of views of a series 40 is able to find them within a series before display of the series 40. A preferred approach is to generate series descriptions for series 40 and studies 30 and to determine the view of a series 40 separately from the rules that govern the hanging protocols.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

GLOSSARY

Comparative review sequence—A comparative review screening protocol comprised of an ordered set of comparative review modes.

Comparative review mode—A screen layout, a study view mode, a series view mode, a hanging protocol and a specified study (Current or Prior), packaged together. A comparative review mode is a feature that, when activated applies a particular screen layout, a study view mode, series view mode, series hanging protocol (per study displayed) and navigation to specific studies.

Current study—The oldest unread study within the study worklist for a patient.

Display area—An area of where studies, series and images are displayed.

Display slot—A location within a display area where a study, series or image is to be displayed.

Hanging protocol—A defined mapping that defines an ordering of the series of a study. The hanging protocol determines how the series of a study are to be arranged on screen within a screen layout.

Image—Each series includes a number of images.

Multi-study screen layout—A screen layout designed to contain and display more than one study. For the purpose of this disclosure, two types of multi-study screen layouts are supported, namely those that can be applied across any number of screens (where the same layout is repeated) and those specially designed to be used with only two screens.

Pinned study—A study that has been pinned in a display slot of a screen layout will remain in that slot during any subsequent study navigation. Only by unpinning the study from that slot can another study be displayed in that slot.

Prior study—A study having the status "Dictated", "Reported" or "Approved" (any status following and including "Dictated").

Radiographic view—A radiographic view of an image taken at a particular orientation within the patient.

Screen layout—A definition of how images of a patient are to be arranged and displayed on screen. A layout is comprised of three components: the number of studies to display, the number of series to display and the number of images to display (each specified in terms of rows and columns).

Series—Each study contains a number of series.

Series view mode—A definition of how various series of a study are to be displayed across multiple monitors for a given screen layout and study view mode. There are two series view modes that will be discussed in this disclosure, namely: "A|A" where images from only one series are displayed in the display slots of a screen layout, over the available screens (as limited by the study view mode); and "A|B" where images from different series are displayed in the display slots of a screen layout, over the available screens (as limited by the study view mode).

Strict hanging protocol—A hanging protocol, that, when applied, will leave a series slot empty if the required series for that slot cannot be found within the study being displayed.

Study—Medical images for a patient are provided in groups of studies.

Study view mode—A definition of how the studies of a patient are to be arranged across multiple monitors for a given screen layout. Three study view modes will be discussed in the present disclosure, namely: the SPAN ONE SCREEN, SPAN TWO SCREENS, SPAN ALL SCREENS study view modes.

Unread study—A study having the status "New", "Trainee Dictation Started", "Trainee Dictated" or "Dictation Started" (any status prior to and including "Dictation Started").

The invention claimed is:

1. A comparative image review system for displaying a first series and a second series associated with a first stud on first and second display areas according to a first comparative review mode having a first screen layout, a first study view mode, a first series view mode, and a first hanging protocol, said first screen layout containing at least one display slot, and also for displaying the first and second series associated with the first study on first and second display areas according to a second comparative review mode having a second screen layout, a second study view mode, a second series view mode, and a second hanging protocol, said system comprising:
   (a) a memory for storing the first screen layout, the first study view mode, the first hanging protocol, the second screen layout, the second study view mode, the second hanging protocol, and first and second series;
   (b) a processor coupled to the memory for:
      (I) using the first screen layout to determine the number of display slots to be associated with the first and second display areas, wherein the first study is displayed within at least one of the display slots;
      (II) using the number of display slots determined in (I) and the first study view mode to determine whether to display the first study both within a display slot associated with the first display area and a corresponding display slot associated with the second display area;
      (III) using the number of display slots determined in (I) and the first series view mode to determine whether to display the first series both within a display slot associated with the first display area and a corresponding display slot associated with the second display area;
      (IV) using the number of display slots as determined in (I), the determinations in (II) and (III) and the first hanging protocol to determine which of, and the order in which, the first and second series of the first study are to be displayed within the display slots associated with the first and second display areas;
      (V) using the second screen layout to determine the number of display slots to be associated with the first and second display areas, wherein the first study is displayed within a display slot;
      (VI) using the number of display slots as determined in (V) and the second study view mode to determine whether to display said at least one study both within a display slot associated with the first display area and a corresponding display slot associated with the second display area;
      (VII) using the number of display slots determined in (V) and the second series view mode to determine whether to display the first series both within a display slot associated with the first display area and a corresponding display slot associated with the second display area; and
      (VIII) using the number of display slots as determined in (V), the determinations in (VI) and (VII) and the second hanging protocol to determine which of the first and second series of the first study are to be displayed within the display slots associated with the first and second display areas.

2. The system of claim 1, wherein the first study is displayed within first and second display areas according to a comparative review sequence, said comparative review sequence comprising an arrangement of said first and second comparative review modes and wherein the first and second comparative review modes are sequentially activated within the comparative review sequence.

3. The system of claim 2, wherein if said processor has previously selected the first study and then applied the second comparative review mode and then selected the second study for display, then the first comparative review mode is automatically re-applied to the second study.

4. The system of claim 2, wherein a required study characteristic is associated with said first comparative review mode and said second comparative review mode and wherein said processor is further used for determining whether to apply the comparative review sequence to the first study by determining whether the first study possesses the required study characteristic.

5. The system of claim 2, wherein said first comparative review mode is associated with a first required study type and said second comparative review mode is associated with a second required study type and wherein said processor is further used for determining whether to apply the first comparative review mode to the first study by determining whether the first study is the first required study type and if so, applying said first comparative review mode to the first study, and if not, then for determining whether to apply the second comparative review mode to the first study by determining whether the first study is the second required study type and if so, applying said second comparative review mode and if not, then not applying either of the first and second comparative review modes.

6. The system of claim 2, wherein the processor also records dictation data in association with the first study, and when the recording of dictation data is complete, the processor causes the first comparative review mode to be applied to the second study.

7. A method for displaying a first and a second series associated with a first study on first and second display areas according to a first comparative review mode having a first screen layout, a first study view mode, a first series view mode, and a first hanging protocol, said first screen layout containing at least one display slot, and also for displaying the first and second series associated with the first study on first and second display areas according to a second comparative review mode having a second screen layout, a second study view mode, a second series view mode, and a second hanging protocol, said method comprising:
   (a) storing the screen layout, the study view mode, the hanging protocol, and the first and second series;
   (b) using the first screen layout to determine the number of display slots to be associated with the first and second display areas, wherein the first study is displayed within at least one of the display slots;
   (c) using the number of display slots as determined in (b) and the first study view mode to determine whether to display the first study both within a display slot associated with the first display area and a corresponding display slot associated with the second display area;
   (d) using the number of display slots as determined in (b) and the first series view mode to determine whether to display the first series in both a display slot associated with the first display area and a corresponding display slot associated with the second display area;
   (e) using the number of display slots as determined in (b), the determinations in (c) and (d) and the first hanging protocol to determine which of and in the order in which, the first and second series of the first study are to be displayed within the display slots associated with the first and second display areas;
   (f) using the second screen layout to determine the number of display slots to be associated with the first and second display areas, wherein the first study is displayed within a display slot;
   (g) using the number of display slots as determined in (f) and the second study view mode to determine whether to display said first study both within in a display slot associated with the first display area and a corresponding display slot associated with the second display area;
   (h) using the number of display slots determined in (f) and the second series view mode to determine whether to display said first series both within a display slot associated with the first display area and a corresponding display slot associated with the second display area; and
   (i) using the number of display slots as determined in (f), the determinations in (g) and (h) and the second hanging protocol to determine which of, and in the order in which, the first and second series of the first study are to be displayed within the display slots associated with the first and second display areas.

8. The method of claim 7, wherein the first study is displayed within first and second display areas according to a comparative review sequence, said comparative review sequence comprising an arrangement of said first and second comparative review modes and wherein the first and second comparative review modes are sequentially activated within the comparative review sequence.

9. The method of claim 7, wherein if the first study has been previously selected followed by application of the second comparative review mode and then selection of the second study occurs, then the first comparative review mode is applied to the second study.

10. The method of claim 7, wherein a required study characteristic is associated with said first comparative review mode and said second comparative review mode and wherein it is determined whether to apply the comparative review sequence to the first study by determining whether the first study possess the required study characteristic.

11. The method of claim 7, wherein said first comparative review mode is associated with a first required study type and said second comparative review mode is associated with a second required study type and wherein it is determined whether to apply the first comparative review mode to the first study by determining whether the first study is the first required study type and if so, applying said first comparative review mode to the first study, and if not, then for determining whether to apply the second comparative review mode to the first study by determining whether the first study is the second required study type and if so, applying said second comparative review mode and if not, then not applying either of the first and second comparative review modes.

12. The method of claim 8, wherein the processor also records dictation data in association with the first study, and when the recording of dictation data is complete, the processor causes the first comparative review mode to be applied to the second study.

13. A comparative image review system for the display of a first series and a second series associated with a first study on first and second display areas according to a comparative review sequence, wherein a first comparative review mode is associated with a first required study type and a second comparative review mode is associated with a second required study type, said system comprising:
   (a) a memory for storing a plurality of comparative review modes, wherein each comparative review mode includes:
      (I) a screen layout defining a number of display slots to be associated with the first and second display areas, wherein the first study is displayed within at least one of the display slots;
      (II) a study view mode that can be used, along with the number of display slots as determined in (I), to determine whether to display the first study both within a display slot associated with the first display area and a corresponding display slot associated with the second display area;
      (III) a series view mode that can be used, along with the number of display slots as determined in (I), to determine whether to display the first series both within a display slot associated with the first display area and a corresponding display slot associated with the second display area;

(IV) a hanging protocol that can be used, along with the number of display slots as determined in (I), the determinations in (II) and (III) to determine which of, and the order in which, the first and second series of the first study are to be displayed within the display slots associated with the first and second display areas;

(b) a processor coupled to the memory for:

(V) selecting at least two of the comparative review modes from the plurality of comparative review modes;

(VI) arranging the at least two comparative review modes in a particular order;

(VII) creating the comparative review sequence from the arrangement in (VI) for application to the first study; and (VIII) determining whether to apply the first comparative review mode to the first study by determining whether the first study is the first required study type and if so, applying said first comparative review mode to the first study, and if not, then for determining whether to apply the second comparative review mode to the first study by determining whether the first study is the second required study type and if so, applying said second comparative review mode and if not, then not applying either of the first and second comparative review modes.

14. A method for the display of a first series and a second series associated with a first study on first and second display areas according to a comparative review sequence, wherein a first comparative review mode is associated with a first required study type and a second comparative review mode is associated with a second required study type, said method comprising:

(a) storing a first comparative review mode and a second comparative review mode, wherein each comparative review mode includes:

(I) a screen layout defining a number of display slots to be associated with the first and second display areas, wherein the first study is displayed within at least one of the display slots;

(II) a study view mode that can be used, along with the number of display slots as determined in (I), to determine whether to display the first study both within a display slot associated with the first display area and a corresponding display slot associated with the second display area;

(III) a series view mode that can be used, along with the number of display slots as determined in (I), to determine whether to display the first series both within a display slot associated with the first display area and a corresponding display slot associated with the second display area;

(IV) a hanging protocol that can be used, along with the number of display slots as determined in (I), the determinations in (II) and (III) to determine which of and the order in which the first and second series of the first study are to be displayed within the display slots associated with the first and second display areas;

(b) selecting at least two of the comparative review modes from the plurality of comparative review modes;

(c) arranging the at least two comparative review modes in a particular order;

(d) creating the comparative review sequence from the arrangement in (VI) for application to the first study; and (e) determining whether to apply the first comparative review mode to the first study by determining whether the first study is the first required study type and if so, applying said first comparative review mode to the first study, and if not, then for determining whether to apply the second comparative review mode to the first study by determining whether the first study is the second required study type and if so, applying said second comparative review mode and if not, then not applying either of the first and second comparative review modes.

* * * * *